US008919743B2

(12) United States Patent
Osborn et al.

(10) Patent No.: US 8,919,743 B2
(45) Date of Patent: Dec. 30, 2014

(54) SYSTEM AND METHOD FOR DISSOLVING GASES IN FLUIDS AND FOR DELIVERY OF DISSOLVED GASES

(75) Inventors: Gregory Scott Osborn, Fayetteville, AR (US); Marty M. Matlock, Fayetteville, AR (US); Shandi S. Teltschik, Papillion, NE (US)

(73) Assignee: Board of Trustees of the University of Arkansas, Little Rock, AR (US)

( * ) Notice: Subject to any disclaimer, the term of this patent is extended or adjusted under 35 U.S.C. 154(b) by 0 days.

(21) Appl. No.: 13/600,859

(22) Filed: Aug. 31, 2012

(65) Prior Publication Data

US 2013/0229889 A1 Sep. 5, 2013

Related U.S. Application Data

(63) Continuation of application No. 11/921,057, filed on Nov. 7, 2008, now Pat. No. 8,276,888, which is a
(Continued)

(51) Int. Cl.
*B01F 3/04* (2006.01)
*B01F 5/04* (2006.01)
(Continued)

(52) U.S. Cl.
CPC ........... *B01F 3/04099* (2013.01); *B01F 3/0473* (2013.01); *C02F 1/74* (2013.01); *C02F 1/763* (2013.01); *C02F 2303/04* (2013.01); *B01F 5/0463* (2013.01); *C02F 2209/22* (2013.01);
(Continued)

(58) Field of Classification Search
CPC .... B01F 3/0473; B01F 3/0876; B01F 5/0463; B01F 5/0498; B01F 3/04099; B01F 2003/04872; C02F 1/78; C02F 7/00; C02F 1/70; C02F 1/72; C02F 1/727; C02F 1/74; C02F 1/763; C02F 2101/305; C02F 2101/306; C02F 2103/007; C02F 2103/343; C02F 2209/02; C02F 2209/22; C02F 2303/04
USPC ........ 261/28, 37, 77, 78.2, 115, 119.1, 122.1, 261/124; 210/221.2, 760
See application file for complete search history.

(56) References Cited

U.S. PATENT DOCUMENTS 3,643,403 A 2/1972 Speece
3,772,187 A * 11/1973 Othmer .......................... 210/622
(Continued)

FOREIGN PATENT DOCUMENTS

DE 35 01 175 A1 7/1986
JP 08132094 5/1996
(Continued)

OTHER PUBLICATIONS

Extended European Search Report; European Patent Office; European Patent Application No. 06771268.7 (Oct. 23, 2012).
(Continued)

*Primary Examiner* — Charles Bushey
(74) *Attorney, Agent, or Firm* — Richard Blakely Glasgow

(57) ABSTRACT

Apparatus and methods are disclosed for facilitating dissolution of one or more gases into a liquid. Preferred gases for use with the apparatus are oxygen, air, and ozone. An apparatus of the present invention includes a dissolution tank that includes a pressure vessel, at least one liquid spray nozzle, and a fluid outlet. The apparatus also includes a gas source, an element for passing fluid into the pressure vessel, and a discharge device connected to the fluid outlet, which discharge device is provided with at least one orifice. Preferred applications include wastewater treatment, treatment of drinking water, fermentation, and bioremediation.

27 Claims, 10 Drawing Sheets

Related U.S. Application Data continuation of application No. 11/137,856, filed on May 25, 2005, now Pat. No. 7,255,332.

(60) Provisional application No. 60/574,152, filed on May 25, 2004.

(51) Int. Cl.
*B01F 3/08* (2006.01)
*C02F 1/78* (2006.01)
*C02F 7/00* (2006.01)
*C02F 1/74* (2006.01)
*C02F 1/76* (2006.01)
*C02F 103/00* (2006.01)
*C02F 1/72* (2006.01)
*C02F 101/30* (2006.01)
*C02F 1/70* (2006.01)
*C02F 103/34* (2006.01)

(52) U.S. Cl.
CPC .......... *B01F 3/0876* (2013.01); *C02F 2209/02* (2013.01); *C02F 2103/007* (2013.01); *C02F 1/78* (2013.01); *B01F 5/0498* (2013.01); *C02F 1/72* (2013.01); *C02F 7/00* (2013.01); *B01F 2003/04872* (2013.01); *C02F 2101/305* (2013.01); *C02F 1/70* (2013.01); *C02F 1/727* (2013.01); *C02F 2101/306* (2013.01); *C02F 2103/343* (2013.01)
USPC ................. 261/28; 261/37; 261/77; 261/115; 261/124; 210/221.2; 210/760

(56) References Cited

U.S. PATENT DOCUMENTS

| | | | |
|---|---|---|---|
| 3,932,282 A | | 1/1976 | Ettelt |
| 3,960,066 A | * | 6/1976 | LaRocco et al. ............. 99/323.2 |
| 4,163,712 A | * | 8/1979 | Smith ............................ 210/622 |
| 4,317,731 A | | 3/1982 | Roberts, Jr. et al. |
| 4,461,426 A | | 7/1984 | Christopher |
| 4,501,664 A | | 2/1985 | Heil et al. |
| 4,735,750 A | | 4/1988 | Damann |
| 4,981,582 A | | 1/1991 | Yoon et al. |
| 5,275,742 A | | 1/1994 | Satchell, Jr. et al. |
| 5,382,358 A | | 1/1995 | Yeh |
| 5,451,349 A | | 9/1995 | Kingsley |
| 5,487,835 A | | 1/1996 | Shane |
| 5,514,264 A | | 5/1996 | Shane |
| 5,569,180 A | | 10/1996 | Spears |
| 5,647,977 A | | 7/1997 | Arnaud |
| 5,674,312 A | | 10/1997 | Mazzei |
| 5,735,934 A | | 4/1998 | Spears |
| 5,766,484 A | | 6/1998 | Petit et al. |
| 5,865,995 A | | 2/1999 | Nelson |
| 5,885,467 A | | 3/1999 | Zelenak |
| 5,904,851 A | | 5/1999 | Taylor et al. |
| 5,911,870 A | | 6/1999 | Hough |
| 5,968,421 A | * | 10/1999 | Schattney et al. ............... 261/49 |
| 5,979,363 A | | 11/1999 | Shaar |
| 6,076,808 A | | 6/2000 | Porter |
| 6,090,294 A | | 7/2000 | Teran et al. |
| 6,193,893 B1 | | 2/2001 | Mazzei et al. |
| 6,279,882 B1 | | 8/2001 | Littman et al. |
| 6,315,893 B1 | * | 11/2001 | Sawada ........................... 210/86 |
| 6,344,489 B1 | | 2/2002 | Spears |
| 6,474,627 B2 | | 11/2002 | Speece |
| 6,485,003 B2 | | 11/2002 | Speece |
| 6,503,403 B2 | | 1/2003 | Green et al. |
| 6,555,059 B1 | * | 4/2003 | Myrick et al. .................. 422/45 |
| 6,568,661 B1 | | 5/2003 | Shane |
| 6,637,731 B2 | | 10/2003 | Shane |
| 6,730,214 B2 | | 5/2004 | Mazzei |
| 6,767,008 B2 | | 7/2004 | Shane |
| 6,840,983 B2 | | 1/2005 | McNulty |
| 6,848,258 B1 | | 2/2005 | Speece |
| 6,877,726 B1 | | 4/2005 | Rindt et al. |
| 6,962,654 B2 | | 11/2005 | Arnaud |
| 6,983,929 B2 | | 1/2006 | Shane |
| 7,008,535 B1 | * | 3/2006 | Spears et al. .................. 210/220 |
| 7,255,332 B2 | * | 8/2007 | Osborn et al. .................. 261/28 |
| 7,294,278 B2 | | 11/2007 | Spears et al. |
| 8,276,888 B2 | * | 10/2012 | Osborn et al. .................. 261/28 |
| 2003/0071372 A1 | | 4/2003 | Scherzinger et al. |
| 2003/0183584 A1 | * | 10/2003 | Galatro et al. ................ 210/760 |
| 2005/0040548 A1 | * | 2/2005 | Lee et al. ........................ 261/76 |

FOREIGN PATENT DOCUMENTS

| | | |
|---|---|---|
| JP | 2001-347146 | 12/2001 |
| JP | 2004 188263 | 8/2005 |
| JP | 2004188263 | 8/2005 |
| WO | 0211870 A2 | 2/2002 |

OTHER PUBLICATIONS

Examiner's Report: Australian Patent Application No. 2006249808, Australian Patent Office (issued May 27, 2010).
Japanese Office Action: Japanese Patent Application No. 2008-513750, Japanese Patent Office (issued Feb. 1, 2011) (English).
Examination Report: New Zealand Patent Application No. 563542, New Zealand Patent Office (issued Dec. 15, 2010).
Mobley Engineering, Side Stream Super-Saturation, http://www.mobleyengineering.com/technologies/hydropowerenhancements.html (last visited May 23, 2012).
Japanese Decision of Final Rejection: Japanese Patent Application No. 2008-513750, Japanese Patent Office (issued Feb. 7, 2012) (English).
Examiner's Report: Canadian Patent Application No. 2,609,030, Canadian Intellectual Property Office (issued Jan. 15, 2013).
Communication: European Patent Application No. 06 771 268.7, European Patent Office (issued Oct. 8, 2013).

* cited by examiner

SYSTEM AND METHOD FOR DISSOLVING GASES IN FLUIDS AND FOR DELIVERY OF DISSOLVED GASES

CROSS-REFERENCE TO RELATED APPLICATIONS

This application is a continuation application of, and claims the benefit of, U.S. patent application Ser. No. 11/921,057, filed Nov. 7, 2008, and issued as U.S. Pat. No. 8,276,888 on Oct. 2, 2012, which is a continuation application of U.S. patent application Ser. No. 11/137,856, filed May 25, 2005 and now issued as U.S. Pat. No. 7,255,332, which in turn claims priority to U.S. Provisional Application No. 60/574,152, filed on May 25, 2004. The disclosures of each of the above-referenced applications are herein incorporated by reference in their entirety.

STATEMENT REGARDING FEDERALLY SPONSORED RESEARCH

Not applicable.

BACKGROUND OF THE INVENTION

Many different systems and methods, depending on application, are available for dissolving gases in liquids. Some of the main applications are the oxygenation of outdoor water bodies, industrial uses, and the treatment of wastewater. Most dissolved gas delivery methods (i.e. bubble diffusion, Venturi injection, U-tubes, Speece cones) are based on increasing the contact time and/or surface area of gas bubbles introduced into a bulk liquid to enhance mass transfer. Previous technologies for dissolving gas into a liquid have features that increase the contact time and/or contact area between gas bubbles and bulk fluid to increase dissolution. Most, if not all, of these earlier technologies require recovery systems for off-gases that do not dissolve into the fluid or allow loss of undissolved gases.

U.S. Pat. No. 5,979,363 (issued to Shaar) describes an aquaculture system that involves piping a food and oxygen slurry into a pond. U.S. Pat. No. 5,911,870 (issued to Hough) proposes a device for increasing the quantity of dissolved oxygen in water and employs an electrolytic cell to generate the oxygen. U.S. Pat. No. 5,904,851 (issued to Taylor et al.) proposes a method for enriching water with oxygen that employs a Venturi-type injector to aspirate gas into a fluid, followed by mixing to increase dissolution. U.S. Pat. No. 5,885,467 (issued to Zelenak et al.) proposes mixing a liquid with oxygen using a plurality of plates or trays over which the liquid flows gradually downward. U.S. Pat. No. 4,501,664 (issued to Heil et al.) proposes a device for treating organic wastewater with dissolved oxygen that employs several process compartments. U.S. Pat. No. 5,766,484 (issued to Petit et al.) proposes a dissolved gas flotation system for treatment of wastewater wherein the relative location of inlet and outlet structures reportedly maximizes the effect of air bubbles in separating solids from the fluid. U.S. Pat. No. 5,647,977 (issued to Arnaud) proposes a system for treating wastewater that includes aeration, mixing/flocculating, and contact media for removing suspended solids, etc. U.S. Pat. No. 5,382,358 (issued to Yeh) proposes an apparatus for separation of suspended matter in a liquid by dissolved air flotation (DAF). U.S. Pat. No. 3,932,282 (issued to Ettelt) proposes a dissolved air flotation system that includes a vertical flotation column designed with an aim of preventing bubble breakage.

Mazzei injectors (see, e.g., U.S. Pat. Nos. 5,674,312; 6,193,893; 6,730,214) use a rapid flow of water to draw gas into the fluid stream; mixing chambers may or may not be used to increase contact time between the gas bubbles and the fluid to increase dissolution. The method of Keirn (U.S. Pat. No. 6,530,895) has a series of chambers under pressure that add gaseous oxygen to fluid; the pressure increase and the chambers in series are used to increase dissolution. U.S. Pat. No. 6,962,654 (issued to Arnaud) uses a radially grooved ring to break a stream of fluid into smaller streams; gas is introduced into the streams and mixing is used to increase dissolution. Speece (see U.S. Pat. Nos. 3,643,403; 6,474,627; 6,485,003; 6,848,258) proposes use of head pressure to introduce liquid under pressure into a conical chamber; the downward flow of the fluid is matched in velocity to the upward flow of gas bubbles to increase dissolution time. Littman et al. (U.S. Pat. No. 6,279,882) uses similar technology to Speece except that the upward flowing bubble size is decreased with a shockwave. Roberts, Jr. et al. (U.S. Pat. No. 4,317,731) propose turbulent mixing in an upper chamber to mix gas with a bulk fluid; a quiescent lower chamber allows undissolved gas to rise back into the upper chamber for remixing. The following U.S. patents use various methods to increase the contact time between gas bubbles in fluids: U.S. Pat. No. 5,275,742 (Satchell Jr. et al.); U.S. Pat. No. 5,451,349 (Kingsley); U.S. Pat. No. 5,865,995 (Nelson); U.S. Pat. No. 6,076,808 (Porter); U.S. Pat. No. 6,090,294 (Teran et al.); U.S. Pat. No. 6,503,403 (Green et al.); U.S. Pat. No. 6,840,983 (McNulty).

An object of the present invention is to provide a simplified, low cost method and apparatus for rapidly increasing the dissolved gas levels in a liquid. A further object of the present invention is to introduce a spray of fluid into a gaseous headspace under pressure in order to greatly increase the rate and degree of dissolution and, if needed, use the pressure within the system to provide energy for mixing.

SUMMARY OF THE INVENTION

An apparatus of the present invention comprises a dissolution tank that includes a pressure vessel for containing a treatment fluid and providing a pressurized gas head space above the treatment fluid. The dissolution tank also includes at least one liquid spray nozzle that permits passage of a source fluid into the pressure vessel, and an outlet for the treatment fluid. The apparatus also comprises pressurized fluid means or means for transporting the source fluid into the dissolution tank, which is in fluid communication with the at least one liquid spray nozzle. A source of gas is also in communication with the dissolution tank. Additionally, an apparatus of the invention comprises a discharge device external the dissolution tank and connected thereto via the fluid outlet. The discharge device is provided with one or more orifices through which treated fluid can pass from the dissolution tank and into a region external the apparatus. An entrainment means may or may not also be provided in communication with the orifice(s).

The present invention operates by introducing small droplets of treatment fluid into a pressurized gaseous headspace in the dissolution tank. This method improves diffusion efficiency and permits almost instantaneous absorption of gas into the fluid to near saturation at the elevated pressure inside the dissolution tank. Droplets of fluid saturated with dissolved gas fall to the bottom of the dissolution tank to form a reservoir supply of treated fluid, which acts as a seal between the pressurized gas headspace and ambient pressure. The treated fluid supply is continuously injected into and mixed with the target fluid being treated at a controlled rate for a specific application. Fluid leaving the discharge device undergoes a large pressure (and energy) drop with the energy utilized for controlled mixing of the treatment fluid with the target fluid.

Mixing can be controlled to produce target concentrations of dissolved gas in the bulk target fluid. Liquid-liquid mixing rates control the delivery of dissolved gas over a range of concentrations as compared with previous delivery methods that entail control of gas-liquid mixing rates. Liquid-liquid mixing can enhance delivery efficiency and efficacy in a variety of applications. The discharge device can be arranged such that a supersaturated or hyperconcentrated fluid stream is rapidly mixed with the target fluid and liquid/liquid mixing occurs. The proper mixing ratio of supersaturated or hyperconcentrated fluid with bulk target fluid ensures that the dissolved gas remains in solution. Alternatively, the supersaturated or hyperconcentrated fluid stream can be introduced to the target fluid without mixing or with minimal mixing such that the excess gas leaves solution in the form of bubbles. The size of these bubbles can be controlled as desired for different applications.

The only gas used in the present invention is that which is dissolved into the liquid spray and exits the dissolution chamber resulting in no gas being used that is not dissolved into the fluid leaving the device and entering the target fluid. Furthermore, the present invention is able to operate without use of gas recovery equipment. Preferred gases for use with the present invention include oxygen, air, and ozone.

DESCRIPTION OF THE INVENTION

The present invention is for a method and apparatus for dissolving a gas in a fluid. An object of the invention is to raise the concentration of a dissolved gas in a target fluid body by discharging into it a fluid having the gas dissolved therein at a higher partial pressure. To this end, a fluid is preferably prepared with the gas at or near saturation levels at a pressure higher than that of the target fluid.

Figure 1:
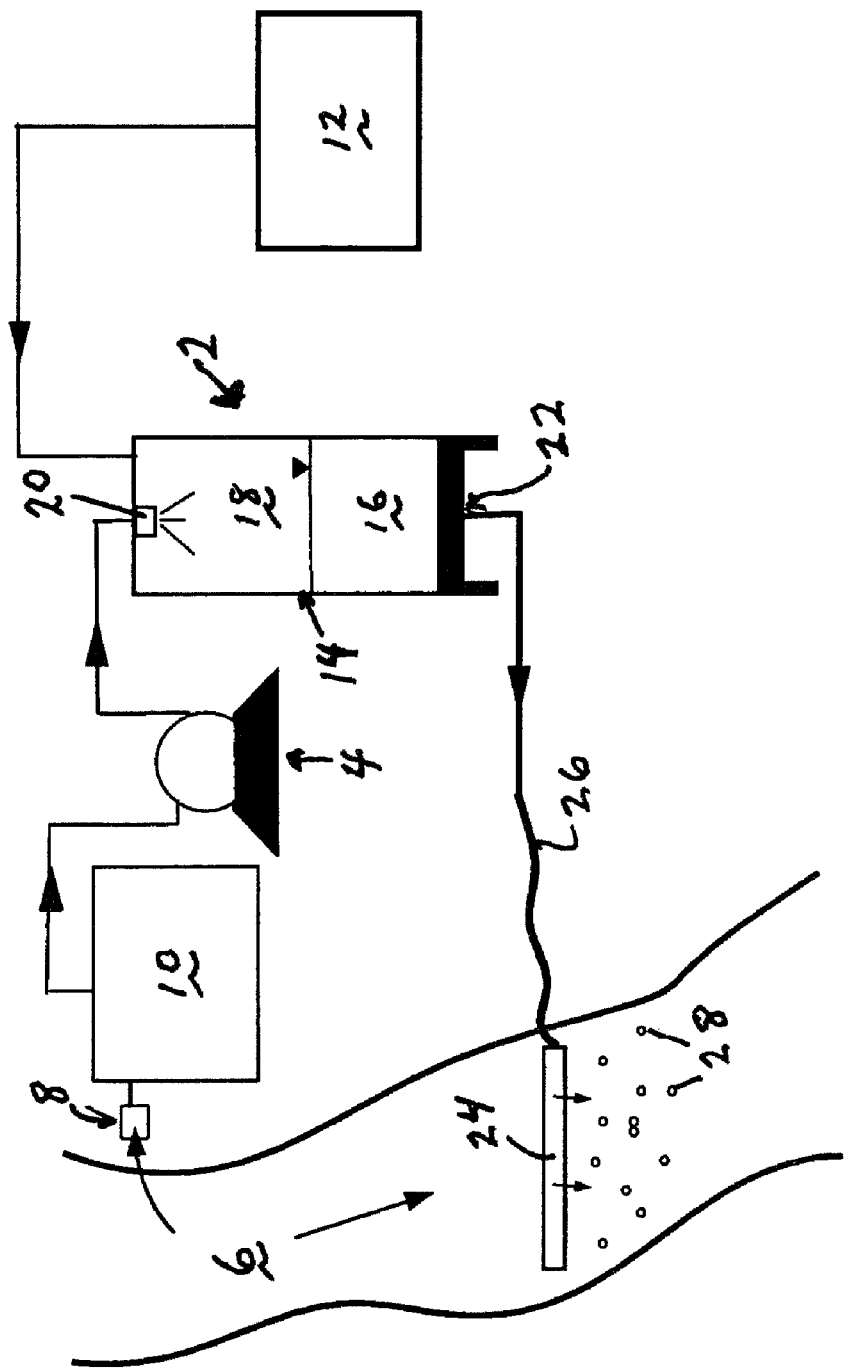
FIG. 1 shows a schematic diagram for treatment of a natural stream with a generic gas using a device according to the principles of the present invention.

As shown in FIG. 1, one embodiment of the invention comprises dissolution tank 2 and fluid pumping means 4 in fluid communication with the dissolution tank. The pumping means receives a source fluid from stream 6 via filter 8 and supply tank 10. A source 12 of the gas is in communication with the dissolution tank. Dissolution tank 2 preferably comprises pressure vessel 14 for containing the treated fluid 16 and providing a gas head space 18 above the fluid at a super-atmospheric pressure. The dissolution tank also comprises at least one liquid spray nozzle 20 that permits passage of source fluid into the pressure vessel through action of pumping means 4. The dissolution tank also comprises an outlet 22 in the tank that permits passage of gasified fluid into discharge device 24, through connecting means 26, where the gasified fluid is discharged into stream 6 by passing through at least one orifice(s) provided in the wall of the discharge device (not shown). Dissolved gas 28 is thereby released into the stream. The gas is preferably air, oxygen, ozone, hydrogen, nitrogen, nitrous oxide, or carbon dioxide, and the liquid is typically composed primarily of water.

A pumping means of the present invention is suitably selected from among (i) a high pressure liquid pump, (ii) a line source, such as tap water, in a residential or industrial setting, or (iii) a plurality of fixed volume vessels capable of forcing liquid into the dissolution tank upon pressurization of the fixed vessel with a high pressure gas that enters the vessel and displaces the liquid through an outlet in the vessel, or (iv) static liquid column head pressure. For most outdoor applications, a high pressure pump is conveniently selected. Many commercial sources are available with the rating depending on application, as is readily apparent to the skilled practitioner.

A gas dissolution system of the present invention can be operated in batch or continuous mode. Whenever the system is operated in continuous mode, it is preferred that the ratio of liquid volume to head space gas volume in the dissolution tank is maintained, which can be done using an open-loop or closed-loop control system.

A source of gas is also a component of the system and depends upon the type and amount of gas required for an application. Air can be pumped directly from the atmosphere into the dissolution tank in some applications. In others, bottled oxygen, obtained cryogenically, or oxygen separated from the atmosphere on-site can be used. In such latter applications, it may be preferable to employ a non-cryogenic means for purifying oxygen from ambient air. Non-cryogenic equipment for purifying oxygen can be obtained commercially, such as from Universal Industrial Gases, Inc. (Easton, Pa.). In still other applications, ozone can be provided, typically by on-site generation of ozone from oxygen or air. Such ozone generators can be obtained commercially from Spartan Environmental Technologies, Inc. (Mentor, Ohio). The ozone generator can be installed conveniently within the dissolution tank.

Fluid in the dissolution tank is contacted with a gas or gases of choice for a predetermined period of time sufficient to bring the fluid to or near saturation with the gas. Next, the fluid containing dissolved gas is passed into the discharge device, which is provided with at least one orifice. Under continuous operation, the number, size, and placement of orifices in the discharge device are preferably predefined so as to permit the rate of fluid flow rate out of the discharge chamber to balance the rate of flow into the dissolution tank, thereby maintaining constant pressure internal the dissolution tank under constant flow conditions. Additionally, the discharge device 24, which is conveniently tube-shaped, can be provided internal a liquid entrainment means 30, such as a hollow tube, so that the fluid containing dissolved gas exiting the device mixes thoroughly with the lower pressure target fluid. The pressure within the dissolution tank can then be used to mix the treatment fluid containing dissolved gases with the ambient pressure target fluid at a controlled rate to prevent or promote the formation of bubbles. Whenever bubbles are generated by the system, they can have an average diameter less than about 150 microns, or in certain applications the average diameter can be in the range of about 10 nm to about 100 nm.

Determination of the number, size and placement of the orifice(s) in the discharge device, as well as the pumping means, gas pressure in the dissolution tank, and fluid flow rate into and out of the tank, can be determined by engineering design calculation and/or on-site calibration through trial and error. Alternatively, it may be preferred to make adjustments from a known set of parameters by making considerations for viscosity, density, and surface tension of the liquid so as to optimize the ratio of gas delivered to energy consumed for a given application. Additionally, it may be desired to regulate the gas saturation threshold for the fluid by thermally controlling the dissolution tank. Moreover, it may be preferred to employ one or more adjustable liquid spray nozzle(s) within the dissolution tank so as to optimize the liquid droplet size and control the rate of gas saturation in the fluid.

A system of the present invention can further comprise an electronic control system for controlling its operation, e.g., by controlling pump speed, gas pressure, valve operation, and the like. The apparatus can further comprise a feedback loop that permits recovery and recycling of the gas to the dissolution tank.

The present invention further contemplates a novel method of dissolving a gas in a fluid. Such method comprises pressurizing an enclosed vessel with the gas, spraying a first portion of the fluid into the vessel containing the gas under conditions effective to dissolve the gas in the fluid, passing the first portion of fluid containing dissolved gas from the vessel into a chamber that is provided with a plurality of orifices and which is immersed in a second portion of the fluid, and discharging the first fluid portion containing dissolved gas into the second fluid portion.

Such a method of the invention can be employed with any, or a combination, of the gases air, oxygen, ozone, hydrogen, nitrogen, nitrous oxide, and carbon dioxide. Conventionally, the liquid primarily comprises water, and may contain significant levels of suspended particles. In a method of dissolution, the portion of the liquid at high pressure within the dissolution tank is preferably dissolved with gas to 95% or greater of saturation, resulting in supersaturation (3000% or greater of saturation) of the liquid after discharge to near atmospheric pressure conditions. Typically, the gas employed is air or oxygen, and the liquid to be gasified is water in a natural or wastewater setting. An oxygen source is preferably obtained by commercial cryogenic methods. In another preferred embodiment of the invention, the gas is ozone and the liquid is water to be purified for home, medical, or municipal use. The ozone can be provided by on-site generation, and preferably enters the dissolution tank at or near ambient pressure, where it is pressurized via a closed system injection of liquid until a desired higher pressure is attained prior to discharge of the gas-containing liquid.

Although the present invention can be employed to dissolve a multitude of gases into a multitude of solutions, the delivery of dissolved oxygen and dissolved ozone in water are of particular interest. The ability of the present invention to deliver dissolved gases at a much higher concentration than previous technologies not only allows for improved effectiveness and efficiency in existing applications but also allows for the development of novel applications. Several of those applications are described below.

I. The Supersaturated Dissolved Oxygen Injector (SDOX)

Figure 2:
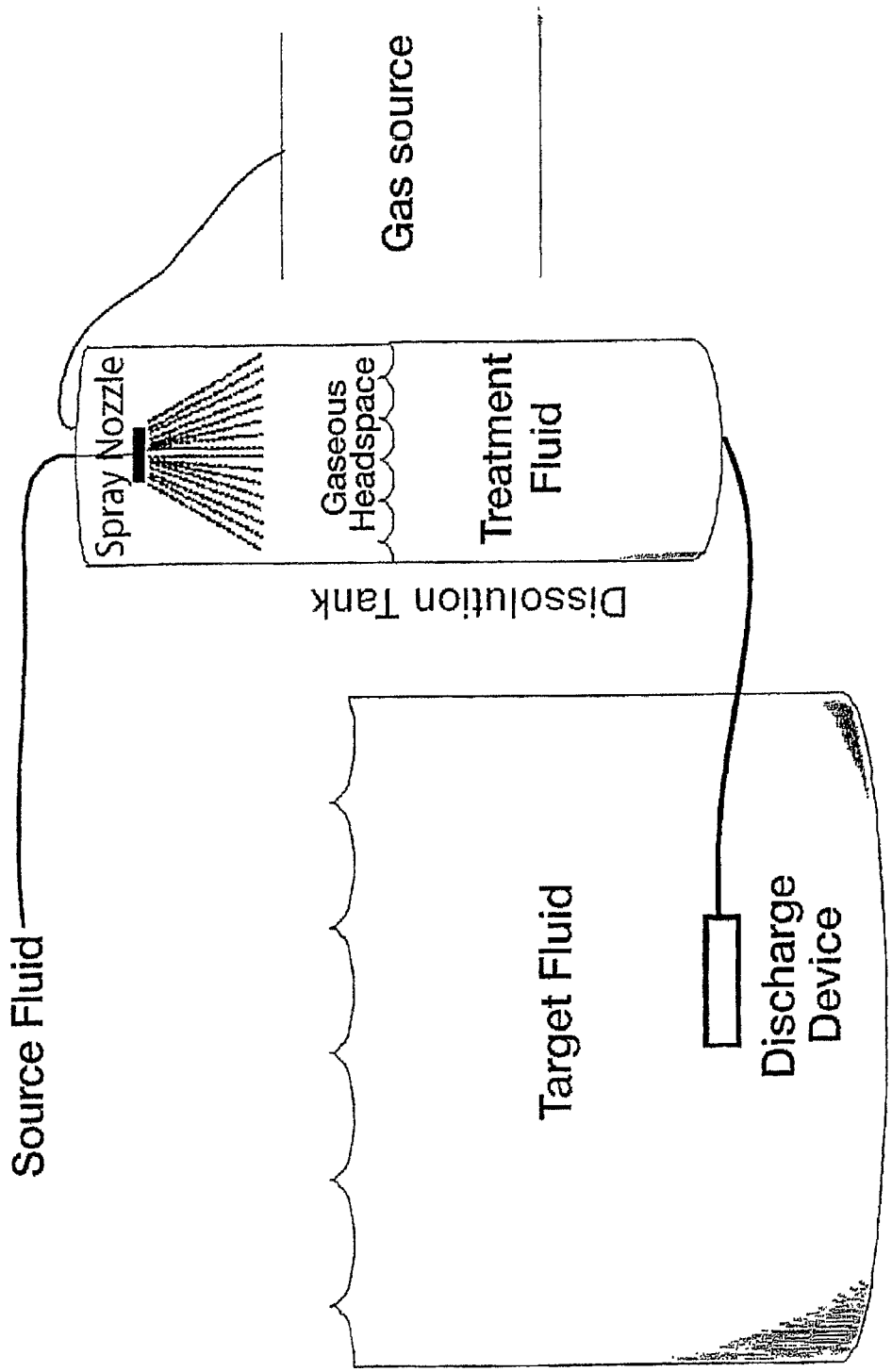
FIG. 2 depicts a generalized schematic of the SDOX and HYDOZ system.

SDOX (as shown in FIGS. 1 and 2) is simple in concept but has a variety of significant advantages compared to currently available systems. SDOX works by rapidly and efficiently dissolving high concentrations of oxygen into source water under pressure and adding this treatment fluid to the target fluid at any location.

SDOX functions by combining a gas with fluid in a dissolution pressure tank. The dimensions of the dissolution tank and operating pressure are determined by the desired gas delivery rate. Sealed input and output ports are connected to the top and bottom end pieces. The dissolution tank includes a fluid layer filling a bottom portion of the tank and a gaseous headspace above the fluid layer in a top portion of the tank.

Source fluid is pulled from any available source and filtered, if necessary, to remove large particles. The source fluid can also be the target fluid so that fluid is recycled through the system and there is no net addition of fluid. The amount and type of particulate that can pass through the system is dependant on limitations of the source of fluid pressure and the opening size of the spray nozzles in the top of the tank. Nozzles of varying diameters can provide controlled spray particle size and fluid pressure boost requirements so the ratio of percent saturation to energy input can be adjusted for different applications. The flow velocity through the nozzle is sufficient to provide high scouring and prevent fouling. No problems with fouling or clogging have been encountered when using water screened from natural sources, such as streams, lakes and wastewater. The source water passes through a pressure source, such as a pump, then through a high pressure hose and into the top of the dissolution tank. The water exits the spray nozzles at the top of the tank in spray form into the gas headspace inside the tank. The pressure drop across the nozzle is used to separate the source water stream entering the dissolution tank into small particles for high mass transfer rate and efficiency.

When dissolving oxygen, for example, it can be provided from any oxygen source, such as compressed air, bottled oxygen, liquid oxygen or an oxygen generation device. Pressure in the dissolution tank can be controlled by the gas pressure regulator set point at the oxygen source or oxygen pressure boost source. The small water particles sprayed from the top of the tank rapidly absorb the oxygen to the point of at or near saturation at the pressure within the dissolution tank. [For example, at a pressure of 110 psi within the dissolution tank, ~8 times more oxygen will be dissolved in water than can occur at atmospheric pressure conditions.] The water droplets with dissolved oxygen fall through the gas/spray headspace to the bottom liquid region of the tank to form a reservoir of treatment water and form a seal between the inlet gas and the tank exit. This seal prevents any gaseous oxygen from exiting the dissolution tank unless it is dissolved in the water and prevents loss of oxygen.

The treatment water exits the bottom of the dissolution tank and passes through a pressure rated hose until it exits the discharge device. The length and diameter of the pressure hose is sized to deliver the oxygen/water solution to the desired site with a minimal pressure drop from pipe friction to prevent gas from exiting solution. The discharge device can be designed to meet specific applications. By matching the friction energy loss across the exit orifice(s) in the discharge device to the flow rate of the source water, the fluid level in the dissolution tank can be maintained at a constant desired level and can become self-controlling during normal operation. Dissolution tank fluid level indicators can be in communication with pump motor speed controls to balance the flow rates for abnormal conditions or disturbances.

Once the treatment water is released to the target water being treated, there is a pressure drop to ambient conditions and the water is then considered supersaturated with oxygen. If the supersaturated water is then mixed with the target water at a ratio resulting in sub-saturated oxygen concentration in the bulk water, the additional oxygen will remain in solution and increase the dissolved oxygen content of the target water. Several methods have been devised to mix the supersaturated water with the water being treated, which are discussed hereinbelow.

If vigorous mixing and wide distribution of oxygen is required, the discharge device is configured such that discharge orifices can be placed inside an entrainment pipe of larger diameter that is open at both ends. The treatment water is then ejected from the orifice at a high velocity into the entrainment pipe. This causes entrainment of the target water into the entrainment pipe and provides vigorous local mixing of treatment water and target water. The mixed water exits the discharge device with velocity to provide distribution of oxygenated water.

If vigorous mixing is not desired and only localized oxygenation is required, the treatment water exits through many smaller orifices rather than a single larger orifice. The multitude of smaller orifices provides the same overall pressure drop when exiting the discharge device as the single orifice. This allows treatment water to be ejected from the discharge with less momentum and at many different directions allowing the dissolved oxygen to be maintained in a smaller area. Entrainment pipes can also be added to each orifice to provide mixing without unidirectional high velocity injection.

The advantage of these methods of mixing treatment water with the target water is that degassing of the supersaturated stream is prevented and no gas bubbles are formed. Mixing liquids with liquids is much more efficient than mixing gases with liquids. Thereby, it is much more effective to mix a supersaturated stream of treatment water into the target water than it is to mix gas bubbles within the target water. In prototype testing, the supersaturated water has been injected into a stream at a depth as shallow as 18 inches without significant degassing of oxygen. Nearly 100% of oxygen delivered to the stream was dissolved and available for biological use.

In certain applications it is desirable to promote the formation of bubbles as the treatment water exits the discharge device into the target water. In this case, entrainment means are not attached to the exit orifices in the discharge device. The release of treatment water into ambient pressure causes the gas to quickly saturate the local water column and leave solution in the form of bubbles the size of which can be controlled by careful selection of dissolution tank pressure, selection of gas, and arrangement and size of exit orifices. These bubbles rise toward the surface of the target fluid body at a rate that is determined by their size and by the viscosity of the target fluid. Some applications that benefit from bubble formation include flotation of suspended solids, inert gas sparging and delivery of gas to solids in the target fluid.

The key differences between SDOX and existing oxygenation technologies are: dissolution tank pressure, water spray into the dissolution tank, and discharge device configuration. By pressurizing the dissolution tank at the contact point between water and oxygen, the solubility of oxygen in water is dramatically increased. This allows much more oxygen to be dissolved into water and increases the rate at which oxygen can be added to water. The added energy requirements to create water flow against pressure are offset by increasing the rate of oxygen delivered per amount of energy consumed. Furthermore, since the pressure that is created inside the dissolution tank is the same that forces the treatment fluid from the discharge device, the energy required to pressurize the tank is partially recovered as energy to mix the treatment fluid with the target fluid. As the treatment fluid exits the discharge device and enters the target fluid, it contains all of the pressure energy added minus system losses. The only significant system energy losses occur across the dissolution tank spray nozzle(s). The remaining energy can then be recovered by using it to entrain the treatment fluid with the target fluid and, in the case of the SDOX, distribute dissolved oxygen throughout the target water supply.

Spraying water into the dissolution tank allows the surface area of contact between water and oxygen to be maximized, which minimizes the required contact time between oxygen and water to reach at or near saturation. By reducing contact time, the retention time of treatment fluid inside the dissolution tank is minimized and the required tank volume for a given water flow rate is minimized. This allows a dissolution tank with a small volume to be used to dissolve a large amount of gas into the fluid. A smaller tank reduces relative capital costs and device footprint and allows the device to be made portable. In addition to potential cost savings, the advantages of the SDOX over existing oxygen delivery technology are summarized as follows:

SDOX can be made portable for deployment at remote locations using a standard gas-powered generator as a source of power. This feature would allow the invention to be moved from location to location to meet seasonal and site specific needs.

SDOX is specifically designed to treat biologically-active water. It delivers dissolved oxygen into the water to quench oxygen demand at the site of consumption.

The treatment water is released from a discharge device that can be placed in any location within the depth of a water column. This controlled delivery of dissolved oxygen can provide a zone of oxygenation wherever and whenever desired.

The injection of treatment water with a controlled direction and velocity does not greatly disturb the water column or sedimentation as can occur with gas entrainment devices such as gas injectors.

SDOX adds no chemicals, catalysts, enzymes, or exogenous materials to the water being treated. Only water, oxygen or air is added.

SDOX is scaleable so the rate of oxygen added can be increased or decreased to account for highly varying oxygen demand. This feature also allows the SDOX system to be operated based on input from a DO sensor, allowing only the required amount of oxygen be added at the required location.

SDOX has a low capital cost because no specialized user training or expensive equipment is involved.

II. The Hyperconcentrated Dissolved Ozone Injector ("HYDOZ")

HYDOZ (as shown in FIGS. 1 and 2) works by rapidly and efficiently dissolving high concentrations of gas (ozone in this example) into water under pressure and adding this stream to the target water at any location. Table 1 gives an idea of the efficiency of ozone delivery using HYDOZ into a water column approximately one meter in depth. Using almost half of the amount of ozone from an ozone generator, HYDOZ is able to achieve more than six times greater concentration of dissolved ozone in the treatment water as compared to fine bubble diffusion where the majority of ozone was lost to the atmosphere due to bubbling out of the top of the water column.

TABLE 1

Ozone delivery data

| System | Ozone generated (g) | Ozone concentration in water (mg/L) |
|---|---|---|
| Bubble diffuser | 4.14 | 2.01 |
| HYDOZ | 2.33 | 12.5 |

HYDOZ functions by combining ozone with water in a pressurized dissolution tank. Source water is sprayed through a nozzle into the top portion of the dissolution tank, which is a gaseous headspace filled with freshly generated ozone that has been pressurized. The small particles of water have a high surface area-to-volume ratio resulting in near instantaneous dissolution of ozone into the water to at or near saturation at internal tank pressure. This results not only in a substantially higher concentration of dissolved ozone in the treatment water than can occur at atmospheric pressure, but also much faster mass transfer from gas to liquid phase. Liquid spray particles fall through the headspace and form a reservoir of treatment fluid at the bottom of the dissolution chamber. The treatment fluid seals the tank from the atmosphere allowing increased pressure to be maintained while water is continuously flowing through the system. The liquid is forced out of the tank through an ozone resistant hose and into a discharge device. The discharge device is configured to regulate liquid flow rate from the high internal pressure to lower pressure in the target water so the dissolution tank pressure can be maintained and controlled. As treatment fluid exits the orifice(s) in the discharge device and enters the receiving water, it becomes hyperconcentrated (substantially higher concentration than typically delivered by current technology, but not necessarily exceeding saturation) with respect to surrounding pressure. The pressure release of the water and associated jet effects provide the energy to mix treatment water with the target water such that hyperconcentrated dissolved ozone does not exit solution and liquid/liquid mixing occurs.

Water is pulled from any available source and screened, if necessary, to remove particles. The source water must not contain any chemicals (e.g., hydrocarbons) that may react with ozone and explode. If target water meets safety requirements, it can be used as the source so that water is recycled through the system and there is no net addition of water. The amount and type of particulate that can pass through the system is dependant on the fluid pressure source used and the spray nozzle(s) in the top of the chamber. Nozzles of varying diameter provide controlled spray particle size and fluid pressure boost requirements so the ratio of percent saturation to energy input can be adjusted for different applications. The flow velocity through the nozzle(s) is sufficient to provide high scouring and prevent fouling. The source water passes through a pump, then through a high pressure hose and into the top of the dissolution tank. The source water exits the spray nozzles at the top of the tank into the ozone headspace inside the dissolution tank. The HYDOZ system can be operated continuously in the same manner as the SDOX or operated in a pulsing mode if tank pressures desired exceed the capability of the ozone generator. For pulsing mode, the pressure inside the tank is pulsed to maximize the amount of ozone dissolved into solution. Ozone is generated and passed into the dissolution tank until the pressure inside the dissolution tank is in equilibrium with the ozone generator. The generator is shut off and a valve is closed to prevent back-pressure against the generator during pump operation and to prevent ozone from escaping the dissolution tank. The fluid pump is then turned on and the dissolution tank is pressurized. The treatment water is released to the target water with no ozone escaping the system. The preceding is then repeated to ensure that all the ozone generated is dissolved into the treatment fluid. Due to the potential instability of ozone at high pressures, the HYDOZ is typically not operated at the same pressures as the SDOX. The energy due to the pressure drop across the nozzle(s) is used to separate the source fluid stream entering the dissolution tank into small, atomized particles. This atomization allows the ozone to dissolve into the sprayed water.

The ozone gas in the dissolution tank may be provided from an ozone generation device. Pressure in the dissolution tank is controlled by the ozone generator's optimal settings. The gas feed to the ozone generator can be either oxygen or dry air depending on the desired concentration of ozone. Oxygen produces higher concentrations of ozone if used as the feed gas. Ozone resistant tubing carries the generated ozone into the top of the dissolution tank. With ozone, the theoretical concentration at saturation is typically not reached because unstable ozone molecules react with one another to form oxygen. However, the ozone is still rapidly absorbed under the operational pressures of the HYDOZ since ozone is 10 times more soluble than oxygen according to Henry's Law of solubility. The hyperconcentrated water droplets fall through the gas/spray headspace to the bottom liquid region of the tank to form a reservoir of treatment fluid and form a seal between the inlet gas and the dissolution tank exit. This prevents any ozone from exiting the dissolution tank unless it is dissolved in the water and prevents loss of ozone.

The treatment fluid exits the bottom of the dissolution tank through an open valve and passes through a pressure and ozone rated hose until it reaches the discharge device. The length and diameter of the pressure hose is sized to deliver the treatment fluid to the desired location with a minimal pressure drop from pipe friction to prevent gas from exiting solution. The discharge device can be designed to meet specific applications. Water level indicators and pressure switches can be fitted to perform both continuous flow and the pulsing variation of flow rates and pressures to maintain a relatively constant concentration of ozone in the dissolution tank via the ozone generator and optimize cost of operation to obtain maximum treatment efficiency.

Once the treatment fluid is released to the target fluid, there is a pressure drop to ambient conditions and the water is then considered hyperconcentrated with ozone. If treatment fluid is then mixed with the target fluid at the proper ratio, the additional ozone will remain in solution and rapidly increase the dissolved ozone content of the target fluid. If the treatment fluid is not mixed with the target fluid, the additional ozone may come out of solution in the form of bubbles the size of which can be controlled by careful selection of dissolution tank pressure, selection of gas, and arrangement and size of exit orifices. Several methods have been devised to mix the treatment fluid with the target fluid, which are discussed hereinbelow.

If vigorous mixing and wide distribution of ozone is required, the discharge device is configured such that an orifice is placed inside an entrainment pipe of larger diameter that is open at both ends. The treatment fluid is then ejected from the orifice at a high velocity into the entrainment pipe. This causes entrainment of the target fluid into the pipe and provides vigorous local mixing of treatment fluid with target fluid. Therefore, the energy put into the system, via pump operation for pressurization, can be recovered for the purpose of mixing which further increases the cost efficiency of HYDOZ.

If vigorous mixing is not desired and only localized ozonation is required, the treatment fluid exits the discharge device through many small orifices rather than a single large orifice. The multitude of smaller orifices provides the same overall pressure drop when exiting the discharge device as the single orifice. This allows treatment fluid to be ejected from the discharge device with less momentum and at many different directions. Entrainment pipes can also be added to each orifice in the discharge device to provide mixing without unidirectional high velocity injection.

The advantage of these methods of mixing treatment fluid with target fluid is that degassing of the dissolved ozone is prevented. Mixing liquids with liquids is much faster and more efficient than mixing gases with liquids. Thereby, it is much more effective to mix the treatment fluid containing dissolved ozone with the target fluid than it is to mix gaseous ozone into the target fluid. The advantages of HYDOZ over previous technologies are summarized as follows:

High concentrations of dissolved ozone in target fluids can be achieved, substantially reducing treatment time and potentially allowing treatment of target fluids that are currently not treatable using ozone.

HYDOZ is scaleable from small portable devices to very large, permanently installed plant-scale devices. Also, the rate of ozone added can be increased or decreased to account for highly varying volumes and loads of contaminants.

Portable HYDOZ can be deployed at different locations and moved in response to immediate needs. The portable devices can also be used at remote outdoor locations using a standard gas-powered generator as a source of power.

The treatment fluid is released from an injector tube that can be placed in any location within the depth of a target fluid column.

HYDOZ adds no catalysts, enzymes, or exogenous materials to the water being treated.

HYDOZ has a low capital cost because no specialized or expensive ozone recovery equipment is involved.

HYDOZ can provide a much greater delivery rate of ozone for the same size ozone generator as compared to competing technologies.

The following sections illustrate some applications of the present invention, but do not limit the invention to those specific applications.

III. Treatment of Wastewater

A. Wastewater Treatment Plant Oxygenation

1. The SDOX can be used to oxygenate forced main or other delivery systems of wastewater at any location between the wastewater source and treatment plant. The SDOX orifice tube is inserted directly into the main pipeline with the injector stream flowing in the same direction as the wastewater. An entrainment tube can be used for enhanced mixing. Pre-treating wastewater in the forced main prevents odors and undesirable chemicals from forming as the wastewater travels through a pipe to the treatment plant, and enhances microbial uptake of oxygen prior to reaching the primary treatment process in the wastewater treatment plant. Energy provided by the pumps charging the dissolution tank can be recovered through mixing of oxygenated water with wastewater and in improved flow control of the wastewater stream to the plant. Oxygenation of wastewater in forced mains can reduce objectionable odors produced during waste treatment processes in the plant. The combination of oxygen concentration delivery control and gas to liquid transfer efficiency make this process a significant improvement over existing technology. Since forced mains operate under positive pressure, enhanced oxygenation can be achieved which will precondition the wastewater for treatment and increase primary treatment capacity.

2. The SDOX can be used as a source of primary aeration, including mixing in aerobic treatment stage of wastewater treatment plant. The orifice tube is placed in an entrainment pipe to mix and distribute oxygenated water. Mixing and water velocity provided by the SDOX will allow sufficient water velocity to prevent settling of solids. Aeration basins typically require large amounts of oxygen; the high capacity of this system will efficiently meet requirements without losing oxygen gas to the atmosphere. Energy consumed by pumps charging the dissolution chambers will be recovered through hydraulic mixing, as each high pressure stream is mixed with the wastewater being oxygenated. Several units may be installed into large aeration basins and entrainment pipes directed to provide the desired mixing pattern throughout the basin. The combination of oxygen concentration delivery control and gas to liquid transfer efficiency make this process a significant improvement over existing technology. It is also very effective in cold climates where treatment under surface ice is desired.

3. Supersaturated dissolved oxygen injection can be configured to be portable (trailer-mounted) to provide oxygen enhancement throughout the wastewater collection systems and treatment plant to prevent undesired anoxic or anaerobic (low to no oxygen concentration) conditions from forming, or to remedy those conditions when they occur. These conditions are a common source for objectionable odors that are produced in the plant, and can result in growth of undesirable microbial communities that can lead to floating of biosolids. The portable injection unit can quickly add oxygen to problem locations resulting from surge loads to convert the water to aerobic (less odor producing) conditions. Common locations for this application include lift stations, settling basins, force mains, biosolids digesting tanks, holding basins, overflow basins, inlet pretreated wastewater pipes, settling basins, screening area, and other wastewater treatment processes. Odors are often the result of a temporary system upset (often unanticipated), so the portability of the injector allows used at multiple locations and for flexibility of response to areas as needed. The portability of this technology, combined with oxygen concentration delivery control and gas to liquid transfer efficiency makes this process a significant improvement over existing technology.

4. Control of target oxygen concentration state of waste treatment systems that require either aerobic or anaerobic conditions. The present invention delivers streams of water supersaturated with a gas such as oxygen for aerobic conditions, or argon, nitrogen, methane, or any other gas for maintaining anaerobic conditions. Anaerobic conditions are often required in waste treatment for a variety of microbial processes. Creating and maintaining these conditions and especially rapidly shifting between aerobic and anaerobic conditions is very difficult using current technology. The orifice tube delivers the control gas needed to maintain the desired process under the desired condition at the desired location. The present invention can cycle different gasses within a design regime, and delivers the gas in solution, so there is little loss to the atmosphere. The combination of gas concentration delivery control and gas to liquid transfer efficiency make this process a significant improvement over existing technology.

5. Biosolids (Sludge) tank aeration and odor control can be accomplished through injection of dissolved oxygen. Biosolids tanks are used to digest organic waste through microbial respiration. This process provides a high oxygen demand and difficult mixing conditions due to the viscosity of the materials being aerated. The SDOX device can provide several injection/entrainment points within the holding tank. Using the orifice tube and entrainment pipe, mixing of large particles can be provided while distributing oxygen throughout the sludge tank. Oxygen increases digestion rates and reduces anaerobic odor formation.

6. A portable SDOX can provide supplemental oxygenation throughout plant/process where needed in response to surge loads or unanticipated system upsets that cause sudden increases in oxygen demand. The device can quickly restore aerobic conditions and be operated for long or short periods of time until process changes are made to correct the problem. The SDOX can be used as supplemental oxygen if a main oxygenation unit fails or requires repair or maintenance. Construction projects can also require process changes and the oxygen injector can be used to reroute a treatment streams temporarily. The portable unit allows for excess treatment capacity without construction of a permanent oxygen delivery system. Also, treatment capacity of the plant can be temporarily increased. The combination of oxygen concentration delivery control and gas dissolution efficiency make this process a significant improvement over existing technology.

7. The SDOX can be used to add dissolved oxygen to the discharge water from a wastewater treatment plant. This oxygen may be necessary to ensure the plant meets permit requirements for minimum DO, or to optimize treatment of refractory compounds, or to enhance uptake of pollutants such as phosphorus. The SDOX orifice tube is placed in the wastewater stream in or near the last treatment step within the plant just prior to discharge into the receiving stream. The entrainment tube can provide mixing and distribution of dissolved oxygen throughout the treated wastewater stream. A dissolved oxygen probe can be used to monitor DO content and activate the supersaturated dissolve oxygen injector as needed to ensure water released into the receiving stream meets minimum permitted DO concentration. The ability to add highly concentrated dissolve oxygen to the effluent stream allows DO to be increased rapidly which in turn, provides a high degree of control over DO of the effluent stream. Also, by increasing the DO content of the effluent stream, additional removal of chlorine residual can be accomplished. The supersaturated oxygen injector provides an effective, inexpensive, efficient method for directly increasing DO of the release stream without losing oxygen to the atmosphere. Dissolved oxygen injection is advantageous for increasing effluent DO since entrainment systems have inherent inefficiencies as oxygen is lost as undissolved bubbles vent to the atmosphere. The combination of oxygen concentration delivery control and gas dissolution efficiency make this process a significant improvement over existing technology.

B. Wastewater Treatment Plant Ozonation

The hyper-concentrated dissolved ozone injector can be used to add dissolved ozone to the basin prior to discharge into the receiving stream. Ozone is a disinfectant and powerful oxidizer that can kill pathogens and oxidize chemical residuals in the water that are not removed in previous treatment steps (such as antibiotic residuals). Ozone is injected into the stream as a replacement for chlorine or UV treatments. The ozone injection provides disinfection without creating the same concerns for disinfection byproducts as occur when chlorination is used. Ozone dissolved in the water reacts quickly and does not leave a residual that must be removed. Sufficient retention time of the ozonated stream will allow all ozone to react. Ozonation has a benefit of creating high water DO that can meet release permits for effluent. The orifice tube is placed in the treated wastewater stream typically in or just prior to the chlorination basin near the last treatment step within the plant just prior to release into the receiving stream. The entrainment tube can provide mixing and distribution of dissolved ozone throughout the treated wastewater stream. An ORP probe can be used to monitor ozone concentration and activate the dissolve ozone injector as needed to ensure water released into the receiving stream meets minimum permitted concentrations of chemical residuals, oxygen, and pathogens. The ability to add highly concentrated dissolve ozone to the effluent stream allows ozone content to be increased rapidly which in turn, provides a high degree of control over treatment of the effluent stream. The ozone injector provides an effective, inexpensive, efficient method for directly increasing ozone concentration of the release stream without wasting oxygen (potential source gas). Release streams are typically shallow (less than 1 m depth) making dissolved ozone injection the best method for ozonation of the stream since bubbling systems result in large amounts of ozone created that is not dissolved. Excess ozone not dissolved in water must be treated as gaseous ozone is a human health hazard.

IV. Treatment of Wastewater Point Sources

The HYDOZ technology is effective, versatile and cost effective device for the application of dissolved ozone to the effluent of critical point sources of medical wastewater to reduce the overall amount of both antibiotic residuals and resistant pathogens that are released to the environment. These point sources include hospitals, large clinics, and pharmaceutical manufacturing plants. By directly treating the wastewater effluent of medical point sources, the concentrations of both pharmaceutical residuals and drug resistant bacteria can be greatly reduced before being mixed with general wastewater at a centralized treatment facility. This critical control point treatment provides two advantages: minimization of costs and minimization of contact time. Treatment costs will be minimized by reducing the total volume of wastewater that needs to be treated (point source effluent vs. total effluent). Also, the contact time between pharmaceutical residuals, such as antibiotics, and bacteria in bacterial-rich wastewater will be minimized. The widespread use of this device may significantly contribute to the reduction of antibiotic resistant pathogens in the human ecosystem and help maintain the efficacy of medically important antibiotics. An additional benefit of application of HYDOZ technology to point source wastewater effluent is disinfection of antibiotic resistant bacteria that if left in the effluent could transfer resistance to commensal bacteria.

Hyper-concentrated dissolved ozone is injected into the raw wastewater effluent from a hospital or other point source to reduce pharmaceutical residuals. This reduces the likelihood of antibiotic resistance reaching the natural environment once released into the receiving stream outside the wastewater treatment plant. Also, drug residuals of concern that are refractory, that is resistant to treatment from wastewater using common waste treatment processes, are oxidized prior to reaching the wastewater treatment plant to make them more labile (treatable). By ozonating the wastewater stream at the hospital or point source, the volume of water that must be treated is at a minimum and the time viable drugs exist outside the point source is minimized. By carefully controlling the concentration of dissolve ozone within the pipe, corrosion is reduced since little excess ozone is present. Injection of ozone can also increase the oxygen content in the wastewater that provides pretreatment and odor reduction prior to reaching the wastewater treatment plant.

V: Treatment of Industrial Wastewater

Food processing facilities use a great deal of water everyday in the food preparation process. The majority of this water is released at the end of the line in an organic waste stream. The solids from this waste stream are high in organic matter, nitrogen and phosphorus content and are often filtered and sold as fertilizer, animal feed or other useful byproducts. The liquid waste stream that remains is also high in dissolved and suspended solids, minerals and organic nutrients. The five-day biochemical oxygen demand ($BOD_5$) value is used to gauge the level of treatment needed prior to releasing the organic wastewater to a natural waterway or a sewer system. Bacterial digestion is the method used to reduce $BOD_5$ to acceptable levels. SDOX can be used to enhance the aerobic digestion of both naturally occurring digestive bacteria and genetically engineered digestive bacteria that are added to industrial wastewater. Portable SDOX units can be moved from location to location during periods of high demand.

A lab-scale SDOX was able to deliver oxygen to target fluid at a rate more than 12 times higher than the currently used technique of bubble aeration. SDOX technology can cycle on and off based on input from a dissolved oxygen sensor and can respond to changing oxygen delivery requirements from industrial wastewater loading rate changes, temperature changes, or other factors.

An additional benefit of aerobic conditions in an industrial wastewater treatment tank or pond that will greatly assist in public relations with food processing facilities is significant reduction of objectionable odors. Some of the byproducts of anaerobic respiration are methane, hydrogen sulfide, amines, sulfides, and esters. Complaints over odors emitted from treatment ponds from residents of neighborhoods built near food processing facilities are sometimes a problem. The maintenance of aerobic conditions would reduce the production of objectionable odors and the use and expense of odor control equipment may no longer be necessary. The use of SDOX can result in several advantages: reduced cost of treatment of organic wastewater, increased capacity of treatment ponds and tanks and decreased odor problems.

VI: Treatment of Drinking Water

HYDOZ can be used for pretreatment of raw water at the influx supply of drinking water treatment facilities and will provide a more effective method of dosing water with ozone for purposes of disinfection and decontamination and to reduce the production of disinfection byproducts. The most significant improvement is that the HYDOZ can create very high concentrations of ozone in water for more effective and rapid oxidation of contaminants while eliminating dangerous off-gassing. The variables that can be adjusted to increase the effectiveness and efficiency of the HYDOZ for treating drinking water include:

Desired ozone concentration in the treatment fluid;
Contact time at a given concentration;
Treatment schedule (continuous versus low/high pulse);
Dose rate adjustment considerations for variable influences;
Dose rate adjustment considerations for bacterial and contaminant load;
Safety of operation (no ozone off-gassing).

1. Ozonation of drinking water or other use water intakes to prevent biofouling. Biofouling of freshwater intake structures, especially with zebra mussels, is becoming a major problem for water suppliers, power plants, and other users of fresh water as these invasive bivalves spread across the United States. Pulse ozonation of intake structure waters using the HYDOZ can discourage colonization on intake structures, reduce current biomass, and prevent clogging of intake structures. The HYDOZ process allows for controlled dosing of ozone in targeted areas under controlled conditions, since ozone is delivered in a liquid solution rather than as a gas entrained in a liquid. The ability to control pulse treatments results in enhanced control of intake water quality as well. The orifice tube structure of the HYDOZ is placed on the intake structure, with jets targeting the critical screen surfaces. Ozone is delivered through a timed control system, a video trigger system, a sonar-sensor system, or other similar indicator mechanism that alerts the system that an organism is colonizing the intake structure. Ozone is released in a high dose pulse as a result.

2. Ozonation of raw intake water to reduce disinfection by-products (DBPs). Raw intake water at drinking water and power plants is disinfected, often with chlorine, to reduce treatment costs after filtration and prevent biofouling. This process in the presences of organic carbon molecules results in formation of a suite of DBPs, including trihalomethanes, trihalo-acetic acids, and others. In low bromide waters, ozone treatment achieves the same level of disinfection without creating DBPs of concern. The HYDOZ is used to treat raw water at intake structures to disinfect raw water at intake structures. The HYDOZ orifice tube is used to inject low to high, continuous to pulse, doses of ozone into the intake pipes, eliminating the need for ozone gas-treated water contact chambers. This process provides controlled dosing to reduce residual ozone in the system, thus reducing the undesirable oxidation of pipes and other process infrastructure. The controlled ozone dosing reduces ozone off-gassing to below hazardous levels, thus eliminating the need for ozone gas scrubbers.

3. Final disinfection and water conditioning prior to chlorination. The HYDOZ is used to treat finished drinking water prior to chlorination to remove organic carbon residuals that might result in DBP formation. The HYDOZ orifice tube is used to inject controlled doses of ozone into the process delivery pipe, eliminating the need for ozone gas-treated water contact chambers. This process provides controlled dosing to reduce residual ozone in the system, thus reducing the undesirable oxidation of pipes and other process infrastructure. The controlled ozone dosing reduces ozone off-gassing to below hazardous levels, thus eliminating the need for ozone gas scrubbers.

4. Ozonation of water prior to biofiltration to increase the filtration efficacy of organic matter removal from water being treated. Oxidation of certain organic compound has been shown to increase the ability of industry-standard biofiltration techniques to remove these compounds. Ozonation at this treatment step in drinking water processes is currently used by several treatment facilities. Ozone delivery using the HYDOZ can more effectively oxidize compound prior to biofiltration.

5. In-line ozonation in distribution systems to reduce DBPs. As treated, chlorinated drinking water is distributed throughout the distribution system, DBPs can increase due to the high concentrations of chlorine residuals within the pipes. Also, as water ages chlorine residuals decrease. Large drinking water systems employ chlorine booster stations. Ozone delivered with HYDOZ can reduce those DBPs in-line as necessary, while maintaining the chlorine residual necessary for disinfection. This process provides controlled dosing to reduce residual ozone in the system, thus reducing the undesirable oxidation of pipes and other process infrastructure. The controlled ozone dosing reduces ozone off-gassing to below hazardous levels, thus eliminating the need for ozone gas scrubbers.

VII. Hybrid Water Treatment Systems (Oxidation Ditches, Wetlands, Lagoons, Etc).

1. Oxygenation for enhanced treatment efficiency in hybrid wastewater treatment systems. Hybrid water treatment systems (those that use both natural and engineered processes) require oxygen at specific points of treatment. SDOX is used to provide oxygen to the water treatment system in a controlled and efficient way. Aeration ponds, lagoons, and oxidations ditches, for example, use a variety of technologies to aerate the systems to enhance microbial degradation of organic wastes, control odors from anoxic/anaerobic processes, provide a viable habitat for fish and other aquatic organisms, and provide aesthetic systems in sensitive areas. The SDOX delivers streams of water supersaturated with oxygen, allowing for delivery of oxygen to the critical location under controlled conditions (mass and volume). Since oxygen is delivered in solution, there is little loss to the atmosphere. The combination of oxygen concentration delivery control and gas dissolution efficiency make this process a significant improvement over existing technology.

2. Oxygenation beneath ice layer for odor control and fish habitat preservation during winter months. Northern temperate lakes often freeze on the surface during winter, resulting in a reduction in oxygen transfer from the atmosphere. This can cause low oxygen concentrations resulting in anaerobic odors and oxygen stress to fish and other aquatic organisms below the ice. The standard practice for preventing oxygen sags is to aerate with surface agitators; however, these prevent ice formation, and can have undesirable effects such as truncated migration of migratory waterfowl. These birds, especially geese, overwinter in these agitated water bodies, resulting in occasional bird kills from extreme cold. The SDOX delivers streams of water supersaturated with oxygen, allowing for delivery of oxygen to the critical location under the ice in controlled conditions (mass and volume). Since oxygen is delivered in solution, there is little loss to the atmosphere and no inhibition of ice formation. The combination of oxygen concentration delivery control and gas to liquid transfer efficiency while maintaining the ice cover make this process a significant improvement over existing technology.

VIII: Treatment of Water Above, Inside or Below a Spillway or Dam

Figure 3:
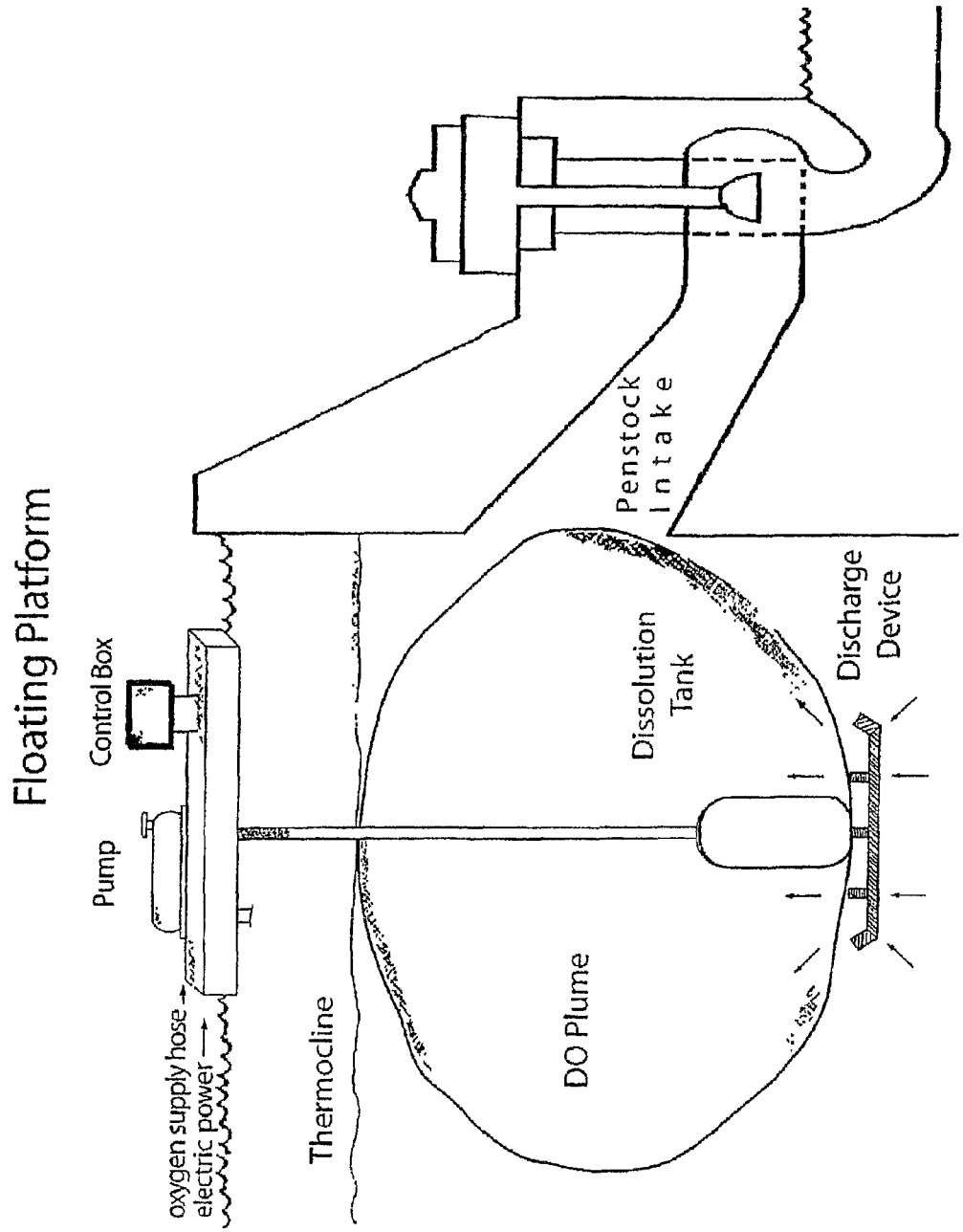
FIG. 3 illustrates a method of oxygen addition to water in a reservoir at the forebay according to principles of the present invention.

As a result of the Clean Water Act, each state has mandated water quality parameters for the release of pollutants from any point source. Hydroelectric dams have been identified as point sources and must follow the same water quality regulations as smaller point sources. For numerous hydroelectric dams, seasonal low DO is an ongoing problem with significant economic impact to the fishing industry and hydroelectric power companies. One method of oxygenating reservoir water is at the forebay as shown in FIG. 3 and could consist of the following steps:

1. During non-generation, an oxygen plume would build up above the dam
2. During generation, the high oxygen plume would be pulled through the penstock
3. System would be sized to maintain specific dissolved oxygen content for the average daily flow rate through the dam.

Oxygen addition with the SDOX technology can also occur further upstream in the lake or in the tailwaters exiting the dam. The benefits of these approaches are as follows:

Changes water chemistry to inhibit mineralization, increasing the life of hydroelectric turbines and equipment Reduce biological oxygen demand and chemical oxygen demand so there is no "sag" in downstream oxygen concentrations Expedites natural oxygenation Forebay used as a buffer, allowing consistent results and operational ease over a wide range of flow rates.

100% oxygen utilization, positioned where it is needed most

IX: Treatment of Groundwater

Accelerated bioremediation is accelerated groundwater and soil bioremediation utilizing an enhancer of the rates of the naturally occurring microbial, chemical and geological processes. Natural attenuation process can be accelerated through the addition of oxygen, nutrients, and/or digestive bacteria. Oxygen acts as an electron acceptor in bacterial respiration processes, and in situ bioremediation has been shown to be much faster in aerobic conditions than in anaerobic conditions. Accelerated in situ aerobic bioremediation has emerged in recent years as a viable and cost-effective remediation strategy for treating contaminated groundwater. Advantages include complete mineralization of the contaminants into less toxic inorganic components in situ with little impact on infrastructure, and relatively low cost compared to more active engineered remedial systems (e.g., groundwater extraction, permeable reactive iron barriers or chemical oxidation). Accelerated bioremediation may also be able to reduce the concentration of certain inorganic contaminants, such as metals, non-metals and radionuclides, through the mechanisms of precipitation and adsorption to soil particles and/or redox reactions. SDOX can be designed to deliver dissolved oxygen and nutrients to groundwater for purposes of accelerated bioremediation. The treatment fluid can be delivered to directional wells within the water table so that a significant portion of the groundwater can be treated due to dispersion throughout an aquifer. In addition, HYDOZ could be used to delivery dissolved ozone to groundwater for break down of more stable groundwater contaminants.

X: Treatment of Rearing Water and Recycled Water in Aquatic Animal Feeding Operations SDOX is an economic new technology to improve oxygen delivery and fine solids removal in aquatic animal production facilities. Both salt water and fresh water in aquatic animal production facilities produce a discharge of total suspended solids from uneaten feed and from feces. The release of total suspended solids into nearby waterways, either after scheduled effluent discharge or from runoff after a rain, causes an increase in the biological oxygen demand that can be damaging to aquatic life. The vicinity surrounding aquatic animal production facilities may be under constant exposure to total suspended solids, which can build up in harbors and other areas where currents are weak.

In addition to increasing the dissolved oxygen content of rearing water and facilitating aerobic digestion of nutrients in wastewater, SDOX can be configured to deliver a stream of water that has been supersaturated with air to wastewater generated by aquatic animal production facilities. The stream of water supersaturated with air would be added without mixing to promote the formation of bubbles. Bubbles can attach to suspended solids and algae in the water column and float them to the surface for easy removal through skimming. Removal of total suspended solids and decrease of biological oxygen demand could extend the water reusage capabilities of aquatic animal production facilities and reduce the impact on the environment.

HYDOZ technology could be used to add ozone to rearing water after the aquatic stock has been removed as an inexpensive method to disinfect and remediate rearing water prior to its reuse and/or discharge. The delivery of dissolved ozone in rearing water will have numerous advantages: high efficiency disinfection of rearing water, especially pathogenic bacteria and viruses; breakdown of complex molecules, such as pharmaceutical residuals and other contaminants; enhanced micro-flocculation of organic matter; and increased dissolved oxygen content after the ozone is reduced to oxygen. CAAP facilities will see an economic benefit to using HYDOZ technology because water can be reused more often before being released as effluent. Additional uses of the present invention include:

1. Oxygenation for enhanced treatment efficiency in hybrid wastewater treatment systems. Hybrid water treatment systems (those that use both natural and engineered processes) require oxygen at specific points of treatment. The SDOX is used to provide oxygen to the water treatment system in a controlled and efficient way. Aeration ponds, lagoons, and oxidations ditches, for example, use a variety of technologies to aerate the systems to enhance microbial degradation of organic wastes, control odors from anoxic/anaerobic processes, provide a viable habitat for fish and other aquatic organisms, and provide aesthetic systems in sensitive areas. The SDOX delivers streams of water supersaturated with oxygen, allowing for delivery of oxygen to the critical location under controlled conditions (mass and volume). Since oxygen is delivered in solution, there is little loss to the atmosphere. The combination of oxygen concentration delivery control and gas to liquid transfer efficiency make this process a significant improvement over existing technology.

2. Oxygenation beneath ice layer for odor control, habitat during winter months. Northern temperate lakes often freeze on the surface during winter, resulting in oxygen stress to fish and other aquatic organisms below the ice. The standard practice for preventing oxygen sags is to aerate with surface agitators; however, these prevent ice formation, and can have undesirable effects such as truncated migration of migratory waterfowl. These birds, especially geese, overwinter in these agitated waterbodies, resulting in occasional bird kills from extreme cold. The SDOX delivers streams of water supersaturated with oxygen, allowing for delivery of oxygen to the critical location under the ice in controlled conditions (mass and volume). Since oxygen is delivered in solution, there is little loss to the atmosphere and no inhibition of ice formation. The combination of oxygen concentration delivery control and gas to liquid transfer efficiency while maintaining the ice cover make this process a significant improvement over existing technology.

XI: Treatment of Animal Waste Lagoons

Concentrated animal feeding operations typically treat animal waste by pumping it to a single-stage lagoon system that is designed to have zones with aerobic (with oxygen) bioactivity and anaerobic (without oxygen) bioactivity. The aerobic zones are located at the surface of the lagoon and the anaerobic zones located nearer to the bottom of the lagoon. The aerobic zones contain aerobic bacteria that breakdown organic waste and reduce biochemical oxygen demand while producing carbon dioxide and microbial biomass. Bacteria in the anaerobic zones break down organic matter and release hydrogen sulfide and ammonia while producing reduced organic molecules that are complex and highly odorous. In a single stage lagoon common to the CAFO industry, it is necessary to maintain both an aerobic and an anaerobic layer in the animal waste lagoon to fully break down all of the waste.

Many animal waste lagoons are either under-designed or overloaded with waste resulting in the entire lagoon being anaerobic or facultative anaerobic and significant emission of odor. One way to reduce emission of odors is to maintain aerobic conditions near the surface. SDOX can create an aerobic layer at the top of the lagoon and could be designed to automatically control the depth of the aerobic layer in an animal waste lagoon in response to changing oxygen delivery requirements from loading rate changes, temperature, or other factors. SDOX can inject oxygenated water into a narrow layer of water without significant mixing, thereby allowing aerobic and anaerobic layers of water to remain stratified. For newer or very high throughput installations, multi-stage lagoons may become economical. SDOX can be adjusted to provide a high degree of mixing and may be useful for maintaining a completely aerobic lagoon within one of the stages of the waste treatment process.

XII. Biotechnology

Control of aerobic state of bioprocess production systems that require either aerobic or anaerobic conditions. The SDOX delivers streams of water or growth media supersaturated with a particular gas for targeted conditions. For example, this system can deliver oxygen for aerobic, or argon, nitrogen, methane, or any other gas for maintaining anaerobic conditions. Anaerobic conditions are often required for a variety of microbial processes. Creating and maintaining these conditions is very difficult using current technology. The SDOX orifice tube delivers the control gas needed to maintain the desired process under the desired condition at the desired location. The SDOX can cycle different gasses within a design regime, and delivers the gas in solution, so there is little loss to the atmosphere. The combination of gas concentration delivery control and gas to liquid transfer efficiency make this process a significant improvement over existing technology.

XIII: Shipboard Applications

The present invention is particularly applicable for the delivery of dissolved gases in shipboard systems, such as wastewater, drinking water, ballast water and bilge water treatment systems, due to the small footprint of these devices and their ability to operate under the rolling conditions that would be experienced at sea. As long as the fluid levels inside the dissolution tank are between maximum and minimum fluid levels, the devices can continue to operate.

For shipboard wastewater treatment, SDOX could replace nonclog diffusion systems in shipboard sewage collection, holding and aeration tanks and would allow delivery of dissolved oxygen to the wastewater at controlled rates. Furthermore, the mixing rate of treatment water with target wastewater could be controlled to promote or prevent settling of sludge as required. The advantages of SDOX technology in shipboard wastewater applications include reduced emission of odor and more rapid bacterial digestion of waste and may allow increased wastewater throughput in existing wastewater treatment systems or decreased footprint of future wastewater treatment systems.

HYDOZ technology would also have application in the effluent holding tanks of wastewater treatment systems and would provide efficient decontamination and disinfection of treated wastewater prior to release or reuse. Currently, treatment with chlorine is used as the final stage of wastewater treatment and requires the storage of explosive hypochlorite on ships. The generation of ozone on site and the immediate delivery of dissolved ozone to wastewater effluent would be a significant improvement in the safety of final stage treatment of wastewater effluent.

Bilge water and ballast water on ocean going vessels can be a transport mechanism for invasive aquatic species. For example, ballast water is collected at port as cargo is unloaded from a ship to maintain the weight balance on the ship and is then released at another port as new cargo is loaded onto the ship. The addition of treatment water that is hyperconcentrated with dissolved ozone to ballast water as it is taken onto the ship would disinfect the water of potentially invasive aquatic species. In addition, HYDOZ could be used to deliver dissolved ozone to ballast water as it exits the ship or could disinfect the ballast water within the shipboard storage chambers as the ship travels between ports.

XIV: Ecosystem Restoration

Ecosystem restoration is a relatively new science. The Society of Ecological Restoration International was formed in 1987. Its mission is "to promote ecological restoration as a means of sustaining the diversity of life on Earth and reestablishing an ecologically healthy relationship between nature and culture." The United States Geological Survey (USGS), seventeen universities, and many international conservation organizations are now actively engaged in ecosystem restoration. The general concept is to "nudge" systems back to a stable state, rather than introduce a dominating process that will exacerbate rather than remediate ecosystem perturbation. The ability of the SDOX to add dissolved oxygen directly to an impaired body of water will provide this gentle nudge to healthy conditions.

SDOX has the ability to create a plume of oxygenated water beneath a thermocline in a lake that can provide an oxygen refuge for fish in the low DO summer season. No other portable device known to the present inventors is able to provide this oxygen plume without disrupting the thermocline. Several examples of SDOX applications are described below.

1. Stream and groundwater oxygenation to enhance microbial processes. The SDOX can provide controlled delivery of oxygen to specific microhabitats within rivers and streams. For example, if an accidental release of a non-aqueous phase liquid such as diesel fuel occurs in a sensitive stream prevents normal delivery of oxygen from the atmosphere, an SDOX could be deployed to rapidly increase the dissolved oxygen content of the subsurface.
2. Delivery of oxygen in water bodies, such as estuaries, streams and reservoirs, can provide oxygen sanctuaries for aquatic life during periods of high stress. The ability of the SDOX to deliver dissolved oxygen beneath a thermocline or a layer of ice will be invaluable in these applications.
3. Provide enhanced aeration controls for aesthetic water bodies (such as river walks, greenways, amphitheater pools, etc) during periods of high oxygen demand. These manmade features are often designed for aesthetic purposes, resulting in reduction of microbial digestion during low flows and high temperatures of summer, when they are most visited. The reduction of microbial digestion results in low dissolved oxygen content and emission of odor. The SDOX can provide targeted curtains of oxygenated water at low costs for enhanced microbial digestion and odor control. One of the most important benefits of oxygen addition via the SDOX is that dissolved oxygen can be added below a layer of ice without disturbing ice formation.
4. Enhance productivity of critical habitats within streams by providing sensitive macroinvertebrate (Ephemeroptera, Trichoptera, and Plecoptera) and fish (madtoms, skulpins, salmonids, etc) with oxygen sanctuaries and corridors, thus reducing the impact of sedimentation, urbanization, and eutrophication on sensitive aquatic species.

XV: Portable Dissolved Gas Delivery Systems

Competing gas dissolution technologies that allows for high gas delivery rates are physically large, not portable, and too expensive for feasible treatment at remote or varying locations. Other currently available gas delivery technologies that are economic and portable cannot provide sufficient gas delivery rates to meet demand in large water bodies or flowing streams. The unique approach of the present invention is that a very high dissolved gas delivery rate can be achieved in an economic device with a small footprint. This provides the ability to economically treat target fluids at remote or varying locations for seasonal and site specific needs.

The present invention is now described with reference to particular examples, which are presented to illustrate the invention, but do not limit it.

EXAMPLES

Example 1

Oxygenation with Air or Oxygen

A proof-of-concept system was constructed and preliminary "proof-of-concept" testing performed using a 1000-gallon capacity plastic tank filled with water containing varying levels of organic pollutants to simulate field conditions. The results of some of the preliminary tests performed are summarized hereinbelow.

Tap water with added sodium sulfite (an oxygen binder) was treated to raise DO from 1 mg/liter to 6 mg/l. Oxygenation rates measured were: bubble aeration 9.1 g oxygen/hr, SDOX with air 22.7 g oxygen/hr, SDOX with oxygen 113.6 g oxygen/hr. Energy to oxygenate the tank water using oxygen and the SDOX was ⅙ that of bubble aeration. Weak animal lagoon water was added to the treatment tanks. Test results indicated the SDOX was able to create a floating layer of algae, and supersaturated DO conditions were maintained throughout the test. The bubble aeration tank created turbulence that continually fractured the algae layer.

Food-processing waste was added to the tank. Indigenous microbes grew rapidly causing the wastewater to have a measured pretreatment DO near zero. The SDOX was able to quickly increase DO to above saturation levels (7 mg/liter) and remove all objectionable odor very quickly.

The optimum operating parameters determined to maximize the ratio of oxygenation rate to power consumed in non-bioactive reduced DO tap water were first determined using the field-scale SDOX (nominal water flow rate of 20 gallons per minute). When the maximum energy efficiency for the field-scale unit was determined to be the minimum nozzle size (1 nozzle) and maximum pressure (100 psi), the test was repeated using the lab scale SDOX (nominal flow rate 2.7 gallons per minute) where a slightly higher pressure and smaller size nozzle could be used.

Figure 4:
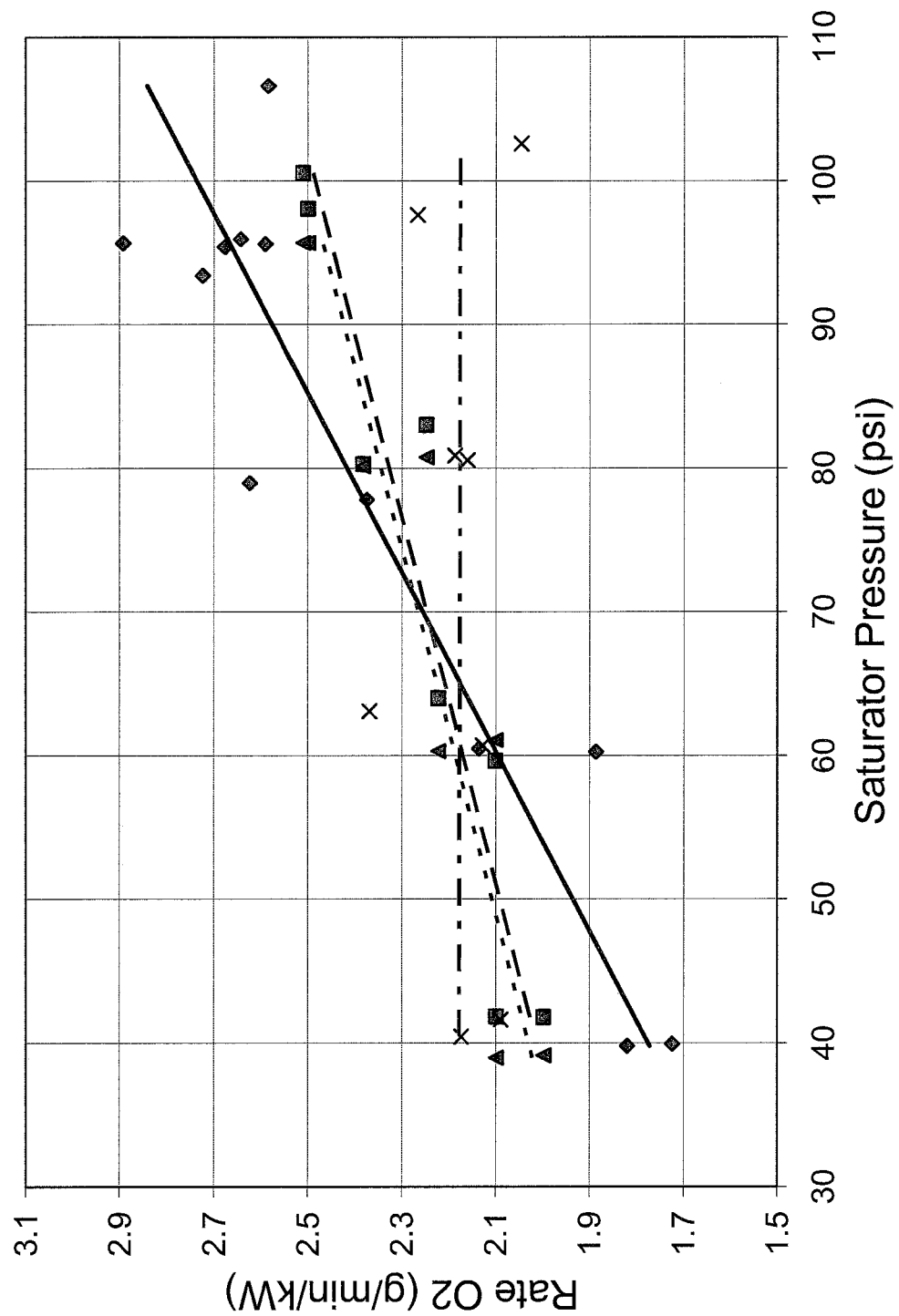
FIG. 4 shows the rate of $O_2$ added per energy (g/min/kW) delivered by a field scale unit as a function of spray nozzle size and pressure inside a dissolution tank. Theoretical energy consumed is a measure of the energy required to deliver oxygen and is independent of motor efficiency. (solid line ♦=1 nozzle, long dash line ■=2 nozzles, short dash line ▲=3 nozzles, long dash short dash line X=4 nozzles).
Figure 5:
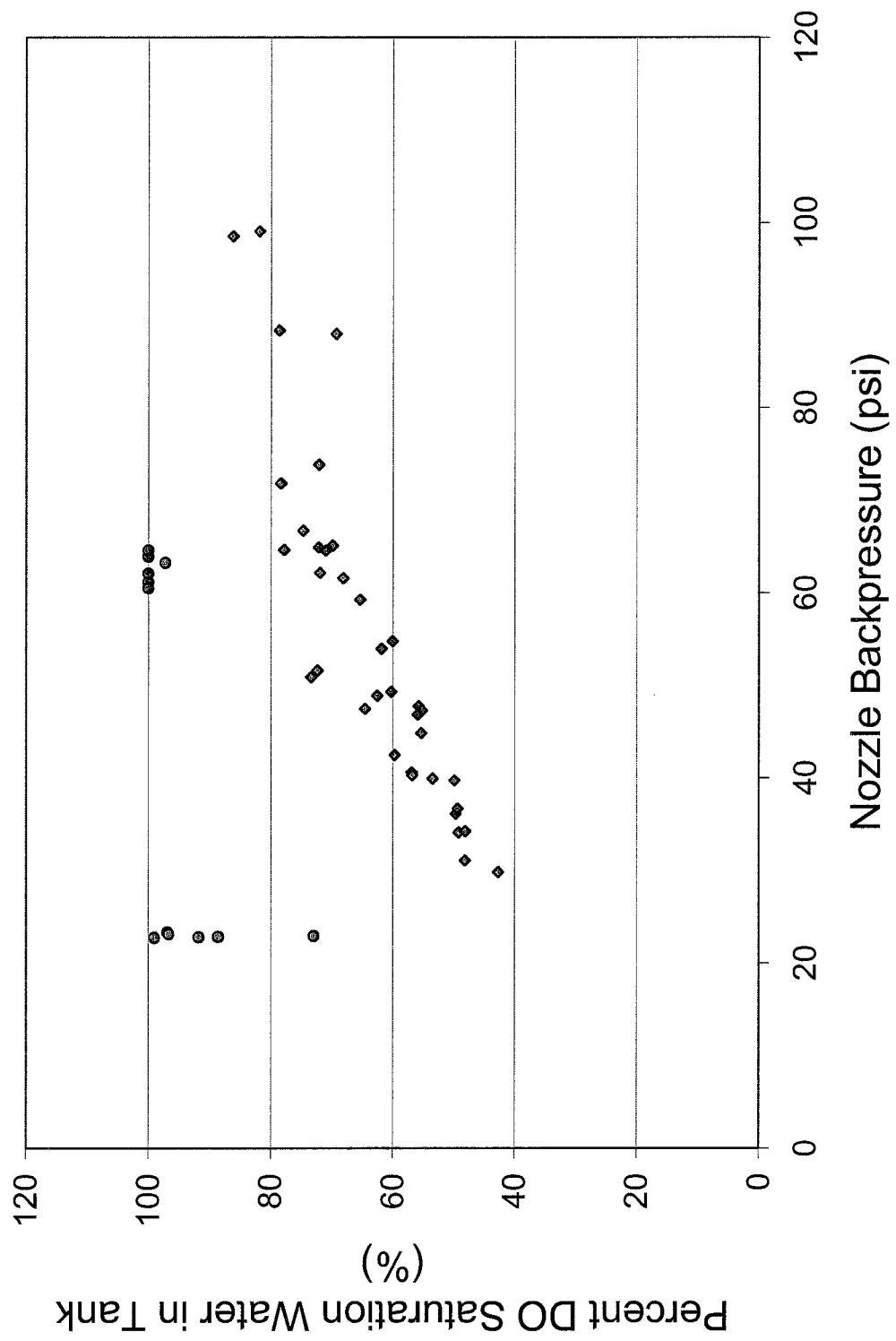
FIG. 5 shows the effect of backpressure due to nozzle type (♦=large nozzles from field-scale unit vs. ●=small nozzles from lab-scale unit on percent saturation of water in the dissolution tank. Water 100% saturated at the elevated pressure in the dissolution chamber (at the pressure set point) would be supersaturated at atmospheric pressure.

This experiment was conducted to determine the overall effect of dissolution chamber pressure, and nozzle size on the efficiency of oxygen delivery in terms of rate of oxygen delivered per energy consumed (g oxygen per minute per kW electricity consumed) as shown in FIGS. 4 and 5. The higher the dissolution tank pressure, the higher the partial pressure of oxygen in the gas (air) and the more oxygen that can be dissolved into the water in the dissolution chamber. However, this increase in oxygen delivery is counteracted by an increase in energy cost since the pump must provide more work to deliver water to the saturator at a higher pressure. Also, as the size of the nozzle decreases, the backpressure against the pump increases, which results in higher pump energy consumption. However, as the nozzle size decreases, the water spray entering the dissolution chamber is increasingly atomized and the percent oxygen saturation increases.

The field-scale SDOX was set to deliver water into the saturator at pressures of 40, 60, 80, and 100 psi. The nozzles were arranged to be tested using 1, 2, 3, and 4 nozzles in parallel (in effect increasing the nozzle diameter and decreasing backpressure with more nozzles). Two tests at each setting were completed and all tests were conducted in random order blocked within number of nozzles (it is cumbersome to change nozzles). Compressed air was used as the gas. Water flow rates were measured as the SDOX delivered microbubbles to deoxygenated water (using 300 grams sodium sulfite to reduce DO to less than 1.0 mg/L) in a 1000 gallon tank. Inlet water to the SDOX was also deoxygenated so the only oxygen added to the system was from the SDOX. DO and temperature were measured using 2 duplicate calibrated YSI-85 probes in the treatment tank. Each test was conducted over a time period of 15 to 30 minutes depending upon the water flow rate into the treatment tank. Tests were ended when water DO exceeded saturation at atmospheric conditions. Energy consumption was monitored by measuring electrical current and voltage for the pump.

Once all data was collected for tests, a first order equation was used to model the DO in the tank as a function of time. The model was useful to calculate the rate of oxygen delivered for all tests at reference conditions for water temperature and initial water DO, which were slightly different between tests. The first order equation is:

$$DO_{(any\ time)} = (DO_{initial} - DO_{final}) \exp(-k*time) + DO_{final} \quad (1)$$

The parameters of k (first order constant) and $DO_{final}$ were fitted to the data using a least squares error method. Average error of prediction was very small at 2%. DO readings were all converted to percent saturation at atmospheric pressure and then back to DO at a standardized temperature of 20° C. Also from this data, the rate of addition of oxygen is reduced with time as the DO of the tank increases and the gradient between DO of treatment water and DO of tank water decreases. This phenomenon does not likely occur during treatment of streams as the water being treated will remain at a constant, low DO since the process will be continuous flow. To represent this effect, the rate of oxygen added to the tank was computed using the first order model (equation 1) with k and $DO_{final}$ computed from each test assuming an initial DO of 1.0 and treating for 1 minute for all tests. Again, this was done to standardize comparisons. The total oxygen added over this minute was assumed to be the rate (g oxygen per minute) added to each tank.

Energy consumption was determined from the equation for energy delivered to the system, not energy actually consumed by the motor. This was done so comparisons can be made between systems of different scale using different pumps. The computation for energy delivered to the system does not include any inefficiencies incurred by the electrical motor. Motor efficiencies can vary widely and can greatly skew comparisons between oxygenators at different scales. For example, the field scale unit uses a centrifugal booster pump with motor with an efficiency of around 50%. The lab-scale SDOX uses a piston displacement pump with a motor 20% efficient. If the rate of oxygen delivered per kW energy consumed by the motors were calculated, the field-scale unit may measure to be significantly better than the lab scale even if the number of nozzles and pressure settings result in exactly the same performance characteristics with the difference being because of the motor only. This problem can be solved by resizing the motor or changing the pump type, without changing the nozzle and pressure configuration.

The energy delivered by the SDOX is given by:

$$E = \text{Backpressure on pump} * \text{Flow rate} \quad (2)$$

Both of these parameters were measured during the tests and efficiency was determined by dividing standardized rate of oxygen delivered by energy delivered. Results are shown in FIG. 4.

The highest efficiency (near 2.7 g $O_2$ per kW) for the field-scale unit was obtained using the highest setting of saturator pressure (near 100 psi) with the fewest number of nozzles (one). This result indicates that if the nozzle size could be reduced and the tank pressure increased, efficiency may increase. The effect of nozzle size on the percent saturation of water in the dissolution chamber was also analyzed using the data above. The nozzles used in the field-scale unit were TF full cone-type, 2F-20, 120° pattern, brass nozzle (BETE Fog Nozzle, Inc.) and the nozzles used in the lab-scale unit were wash jet-type, #25, 15° spray pattern (Spraying Systems Co.; Wheaton, Ill.). As nozzle size decreases, the water spray into the dissolution chamber is increasingly atomized and backpressure behind the nozzle increases.

FIG. 5 shows the effect of increased nozzle backpressure on the percent saturation of water in the dissolution chamber. The dissolution chamber pressure is held constant at the desired set point in these experiments. The smaller nozzles in the lab-scale unit were able to increase saturation efficiency to nearly 100% at some of the testing points. This indicates the type of nozzle used is important for optimizing the rate of gas dissolved in the liquid per power consumed. A suitable commercially available nozzle can be obtained from Spraying Systems Co. (Wheaton, Ill.).

The effect of dissolution tank pressure on efficiency of oxygen delivery was explored for the two nozzle sizes in the lab-scale unit. It was possible to achieve higher dissolution tank pressures with the lab-scale unit. Both nozzle sizes were able to achieve peak efficiencies close to 4.5 g $O_2$ per kW, which is a substantial increase over the field-scale unit with less optimal nozzles.

Example 2

Comparison of SDOX with Other Devices

A device of the present invention was compared to currently used technology for providing oxygen to wastewater. The most commonly used technologies are fine-bubble aeration provided through diffusers by blowers or compressors using atmospheric air (fine-bubble air) or compressed oxygen (fine-bubble oxygen).

Mixed Liquor was obtained from the Fayetteville, Ark. wastewater treatment plant. The wastewater was stored in a 550 gallon plastic tank until used in these tests. The mixed liquor quickly become anaerobic and remained so until testing. Each test began by transferring approximately 100 gallons of the mixed liquor into an open-top 1000 gallon tank. Then 700 gallons of reduced DO tap water (sodium sulfite was used to remove oxygen) was added. The wastewater solution was then mixed using a sump pump turned on its side. Two calibrated YSI-85 DO probes were placed into the wastewater and initial samples were collected at two hour intervals for Specific Oxygen Uptake Rate (SOUR), solids, and BOD5 (dissolved oxygen consumed in 5 days by biological processes). An SDOX according to the present invention was operated at a dissolution tank pressure of 110 psi with one small nozzle. The standard air and oxygen fine-bubble systems (obtained commercially from Sanitaire Corp. (Brown Deer, WS) were operated by providing compressed gas into a rubber diffuser that is commonly used in the wastewater aeration industry. The flow rates for standard bubble aeration were 15 L/min for oxygen and 34 L/min for air.

Figure 6:
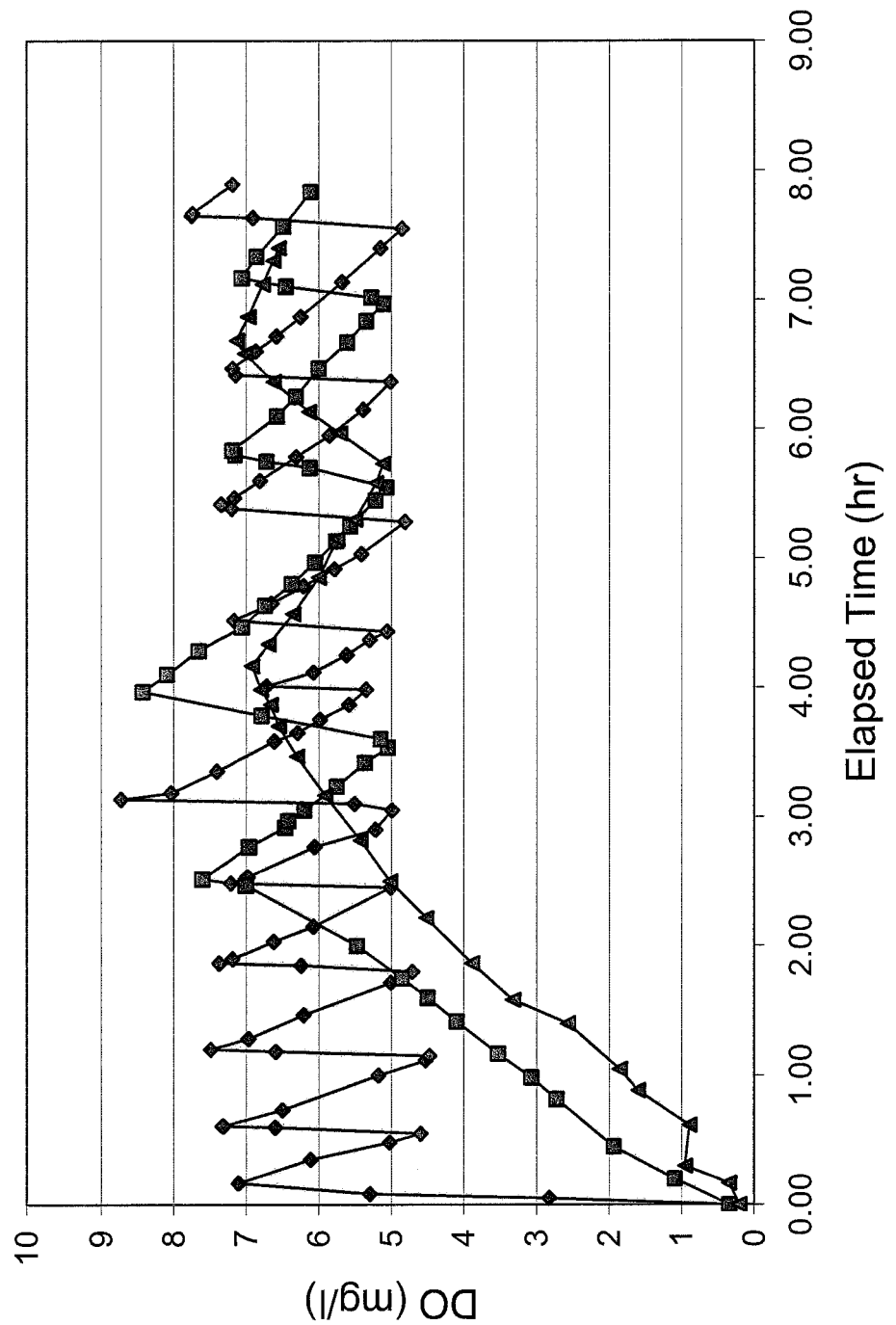
FIG. 6 depicts DO levels as a function of time for different operating regimens (♦=present invention: "SDOX"; ■=fine-bubble oxygen: oxygen bubbled into bottom of tank using typical diffuser; ▲=fine-bubble air: air bubbled into bottom of tank using typical diffuser. The SDOX quickly raised DO levels and each peak in its line shows that when the device is turned on the DO level rises quickly, which permits the device to be turned off for the majority of each hour.

The equipment tested (SDOX, standard bubble aeration, standard bubble oxygenation) was operated until the DO in the tank reached 7.0 mg/l. At this point, the equipment was turned off and remained off until the DO dropped to 5.0 mg/l. As shown in FIG. 6, this sequence of operation was continued for 8 hours and ensured that each piece of equipment need only be operated at its minimum duty cycle to provide adequate oxygen (5.0-7.0 mg/l) for biological treatment to occur.

Specific oxygen uptake rate (SOUR) and 5-day biochemical oxygen demand (BOD5) were measured during treatment of wastewater using standard methods (APHA, 1998). The results show that, as expected, if sufficient oxygen is provided, the biological processing to remove BOD will occur. SOUR is the rate of oxygen consumed per mass of volatile solids. Volatile solids indicate mass of bacteria and SOUR indicates the activity of the bacteria consuming the solids. Bacteria found in municipal wastewater treatment systems have been carefully evolved over time to provide the most efficient treatment of BOD. When the oxygen demand of these bacteria is met, they quickly reduce their consumption per mass. This data indicates a typical result when "stale" bacteria are used in a batch process (the bacteria are stale since they were stored for several days and allowed to become anaerobic). The BOD5 data indicates significant reduction has occurred in all three treatments and, as expected, by providing sufficient oxygen to the system, the desirable biological processes can occur. Based on the BOD data, the time to reduce the BOD in each tank was estimated by determining the amount of remaining BOD that needed to be removed after the 8 hour treatment and determining the rate of reduction of BOD for each treatment based on the 8 hour test. The time remaining was added onto the 8 hours for an estimate of the total time required. The data available to make these estimates is limited, so cost comparisons per 8 hour basis were also made.

The source of oxygen was a 4 foot compressed oxygen cylinder with a volume of approximately 42 liters. The source of air was a 4 foot compressed air cylinder. Since compressed gas cylinders were used, no source of electricity was required for the fine-bubble system. Oxygen and air from these cylinders is much more expensive than can be acquired for larger scale operations. Air, in particular, is much cheaper if a blower or compressor is used directly. However, the air flow rates required for this test were beyond the capability of any available and affordable compressor units and a cylinder was used. The costs for providing 34 L/min of compressed air with a 5 hp compressor can be estimated from US DOE, Industrial Technology Program Compressed Air Tip Sheet #1 (www.e-ere.energy.gov/industry/bestpractices). The costs of using this compressor on the test system are estimated below those for a comparison to fine-bubble air systems.

Cost data showed a large savings provided by an SDOX of the present invention, with the treatment level provided at least equal to that of the other treatments. The estimated time to reduce BOD5 by 50% was slightly less for the present invention (lab scale) compared with standard bubble aeration. It is believed that alternative systems would be deemed feasible if a 15% to 40% reduction in cost were achieved. This objective was exceeded when the SDOX was shown to achieve an 83% reduction in cost, as shown in Table 1.

TABLE 1

Comparison of three $O_2$ delivery technologies by efficiency and cost.

| | Present Invention | Standard bubble aeration | Standard bubble oxygenation |
|---|---|---|---|
| $O_2$ delivery rate | 156 g $O_2$/hr | 6.4 g $O_2$/hr | 27 g $O_2$/hr |
| Rate of energy consumption | 0.956 kW | 3.7 kW (estimated for properly sized 5 hp blower) | 0.0 kW |
| Average Cost Oxygen or Air | $0.41/hr | $4.00/hr (air cylinder) | $1.96/hr (cylinder) |
| Actual Operating time of device over 8 hr test | 0.54 hr | 5.65 hr | 3.35 hr |
| Actual Cost to Oxygenate for 8 hrs (electricity $0.06/kW-hr) | $0.25 | $22.60 (cylinder) $1.27 (Estimated Blower) | $6.57 (cylinder) |
| Estimated Time to Reduce BOD by 50% based on Observed Rates | 16.5 hr | 19 hr | 30 hr |
| Estimated Cost to Reduce BOD by 50% | $0.52 | $53.68 cylinder $3.02 | $24.64 |
| Cost Savings % | — | 99% cylinder 83% estimated blower | 98% |

The present invention was compared to surface impeller and drop structure treatment. These are technologies often used to treat high strength wastes that would be typical of those generated at an animal production or food processing facility. A surface impeller is a device that agitates the surface of a pond or tank to increase the amount of oxygen from air dissolved into the wastewater through physical entrainment. A drop-structure uses the potential energy of flowing water to fall through air and create agitation at the surface which increases the surface area of wastewater exposed to ambient air and mixes in air via entrainment when the water drops through the surface. The agitator was ¾ horsepower rotating shaft with an impeller. The drop structure used a pump to circulate the wastewater to an elevation of 4 feet above the water surface at the drop point. The flow rate of the pump was 120 liters per minute. The present invention was used at a dissolution tank pressure of 110 psi with one small nozzle.

The wastewater used for these tests was obtained from a hog house manure pit located at the University of Arkansas Swine Research Facility in Savoy. The liquid waste was stored in a 550 gallon plastic tank until used. The waste quickly become anaerobic and remained so until testing (16 days). Testing with each aeration technology began with setup of the equipment and instrumentation. Approximately 70 gallons of manure were added to 730 gallons of water in a 1000 gallon tank to provide a moderately high strength wastewater (BOD5 of about 750 mg/l). The wastewater had relatively high concentrations of ammonia (>120 mg/l) and phosphorus (>25 mg/l), but low concentrations of nitrate (<1.0 mg/l) at the start of testing. Aeration testing was conducted for 8 hours with frequent sampling of DO, BOD5, SOUR, temperature, and nutrients.

Figure 7:
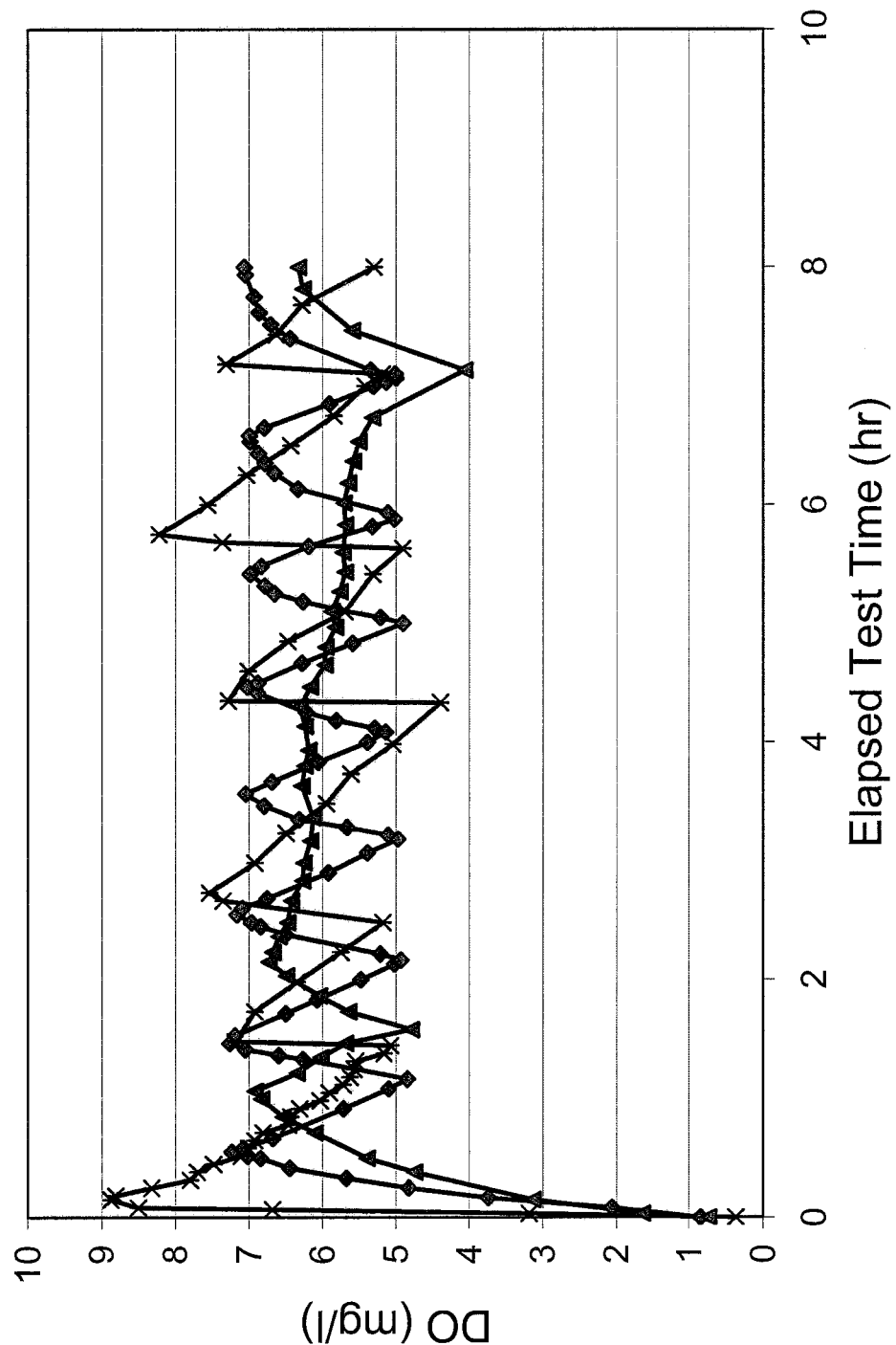
FIG. 7 illustrates relative DO levels vs. time for three technologies (X=present invention: "SDOX"; ♦=Agitator R1: typical surface agitation using submerged impeller with air entrainment; ▲=Drop Structure R1: commonly used entrainment by pumping water to height above water surface and dropping water stream into surface, causing entrainment).

Calibrated DO probes (YSI-85) were placed into the water and testing began. The equipment was operated until the DO of the water reached 7 mg/L at which point the equipment was turned off. Operation began when the DO of the water dropped below 5 mg/L. Dissolved oxygen data are shown in FIG. 7. As occurred with the mixed liquor tests, an SDOX according to the present invention was able to provide oxygen to the system much more rapidly than either surface agitation or the drop structure.

Samples for BOD5, SOUR, and solids were collected at elapsed times of 0, 0.25, 1, 2, 4, and 8 hrs. Each of these tests was replicated for a total of two tests using each technology. The BOD5 and SOUR data indicates that the swine waste was very strong wastewater and provided a stern test for the technologies. The BOD5 and SOUR data also indicate that typical biological treatment is occurring for all tests as these measures are decreasing, albeit slightly. These experiments were conducted outdoors and the wastewater temperatures were near 10° C., so biological processing of BOD was expected to be slow. The wastewater temperature between treatment tests was difficult to control, so temperature correction of all process rates to a normalized value at 20° C. was made using the method of Chapra (S. Chapra, 1997, Surface Water-Quality Modeling. WCB/McGraw-Hill, Boston, Mass.).

Time to reduce BOD5 by 50% was estimated from the test data. BOD removal rates were standardized to 20° C. for computation of total treatment times in Table 2. The SDOX data indicated an average time savings of removing 50% of BOD of 38.9% under surface agitation and 19.9% under drop structure treatment. These savings meet the criteria established in objective 3 of 15-40% savings for success. These data contain much variation because of the variation in BOD in the raw wastewater. It is noted that the swine wastewater data show much more variation than the relatively processed and consistent mixed liquor.

TABLE 2

Rates of reduction of BOD from each treatment process

| Treatment | % Reduction | | Rate of Reduction | | Est'd Time |
| --- | --- | --- | --- | --- | --- |
| | BOD5 (%) | SOUR (%) | BOD5 (%/hr) | SOUR (%/hr) | to Reduce BOD5 (hr)* |
| Agitation R1 | 4.0 | 4.17 | 0.5 | 0.521 | 72.8 |
| Agitation R2 | 15.4 | 2.25 | 1.9 | 0.281 | 17.9 |
| Drop Structure R1 | 0.8 | 1.57 | 0.19 | 0.197 | 190.0 |
| Drop Structure R2 | 9.2 | 4.58 | 1.1 | 0.573 | 33.1 |
| SDOX R1 | 7.4 | 2.50 | 0.9 | 0.312 | 37.7 |
| SDOX R2 | 15.2 | 3.92 | 1.9 | 0.490 | 15.3 |

*Estimated time to reduce BOD5 50% 20 deg C.

Ammonia (as ammonium), dissolved phosphorus, nitrate, and nitrite samples were collected at the end of each test. Nutrient dynamics across all treatments were as expected for bio-solids that were converting from anaerobic to aerobic respiration and growth processes [Table 3: (−) means increase in nutrient]. Nitrites increased in each case, even doubling in the drop structure treatments, reflecting a probable oxygen limitation in the bacterially-mediated nitrification process that converts ammonia to nitrate. Nitrates decreased in four of the six trials, and each treatment process reduced ammonia by between 2 mg/L (2%) and 21 mg/L (13%). Phosphorus uptake was highest in the drop structure, and lowest in the SDOX. Nutrient dynamics observed in treatment of this high strength waste reflect microbial uptake processes, and thus are rather variable, given the size of the test system. The SDOX does not appear to reduce these pollutants any more effectively than other technologies. However, it is clear that the SDOX aeration system was approximately as effective at supporting microbial dynamics as the conventional treatment systems.

TABLE 3

Summary of nutrient reductions in two replications of each treatment.

| | Nutrient Reductions (mg/l/%) by Aeration Processes | | | | | |
| --- | --- | --- | --- | --- | --- | --- |
| | SDOX | | Agitation | | Drop Structure | |
| Parameter | Rep 1 | Rep 2 | Rep 1 | Rep2 | Rep 1 | Rep 2 |
| NO$_2$—N (Nitrite) | 0/0 | −0.05/−41 | −0.05/−67 | −0.02/−23 | −0.07/−115 | −0.06/−100 |
| NO$_3$—N (Nitrate) | 0.06/11 | 0.02/5.1 | 0.12/25 | 0/0 | −0.05/−12 | 0.06/12 |
| NH$_4$—N (Ammonium) | 10.2/4.4 | 10.4/8.3 | 2.13/1.8 | 3.44/2.6 | 21.3/13 | 8.70/5.7 |

TABLE 3-continued

Summary of nutrient reductions in two replications of each treatment.

| | Nutrient Reductions (mg/l/%) by Aeration Processes | | | | | |
|---|---|---|---|---|---|---|
| | SDOX | | Agitation | | Drop Structure | |
| Parameter | Rep 1 | Rep 2 | Rep 1 | Rep2 | Rep 1 | Rep 2 |
| $PO_4$—P (Dissolved Phosphorus) | −0.28/−1.0 | 0.09/0.4 | 2.39/8.6 | 1.57/5.7 | 4.99/17 | 3.36/13 |

Treatment costs were compared and, again, the SDOX showed a substantial cost savings. When actual costs were compared for conducting the 8 hour tests, substantial costs savings were computed. Operating costs and time to reduce BOD5 by 50% are shown in Table 4 hereinbelow.

TABLE 4

Comparison of three aeration technologies in terms of time and cost

| | This Invention | | Surface Agitation | | Drop Structure | |
|---|---|---|---|---|---|---|
| | Rep 1 | Rep 2 | Rep 1 | Rep 2 | Rep 1 | Rep 2 |
| $O_2$ delivery rate (g O2/hr) | 184 | 101 | 21 | 13 | 13 | 16 |
| Power (kW) | 1.08 | 0.965 | 0.589 | 0.583 | 1.089 | 1.085 |
| Average Cost Oxygen or Air ($/hr) @ $0.00218/liter | 0.48 | 0.26 | — | — | — | — |
| Operating time over 8 hr test | 0.173 | 0.168 | 3.97 | 4.125 | 7.43 | 5.083 |
| Total Cost ($) (electricity $0.06/kW-hr) | 0.0943 | 0.0534 | 0.14 | 0.144 | 0.485 | 0.331 |
| Ave Actual Cost Savings (%) | — | — | 74.0 | | 81.9 | |
| Estimated Time to Reduce BOD 50% (20° C.) | 37.7 | 15.3 | 72.8 | 17.9 | 190 (not used) | 33.1 |
| Ave Time Savings of SDOX (%) | | — | | 38.9 | | 19.9 (rep 2 only) |

Figure 8:
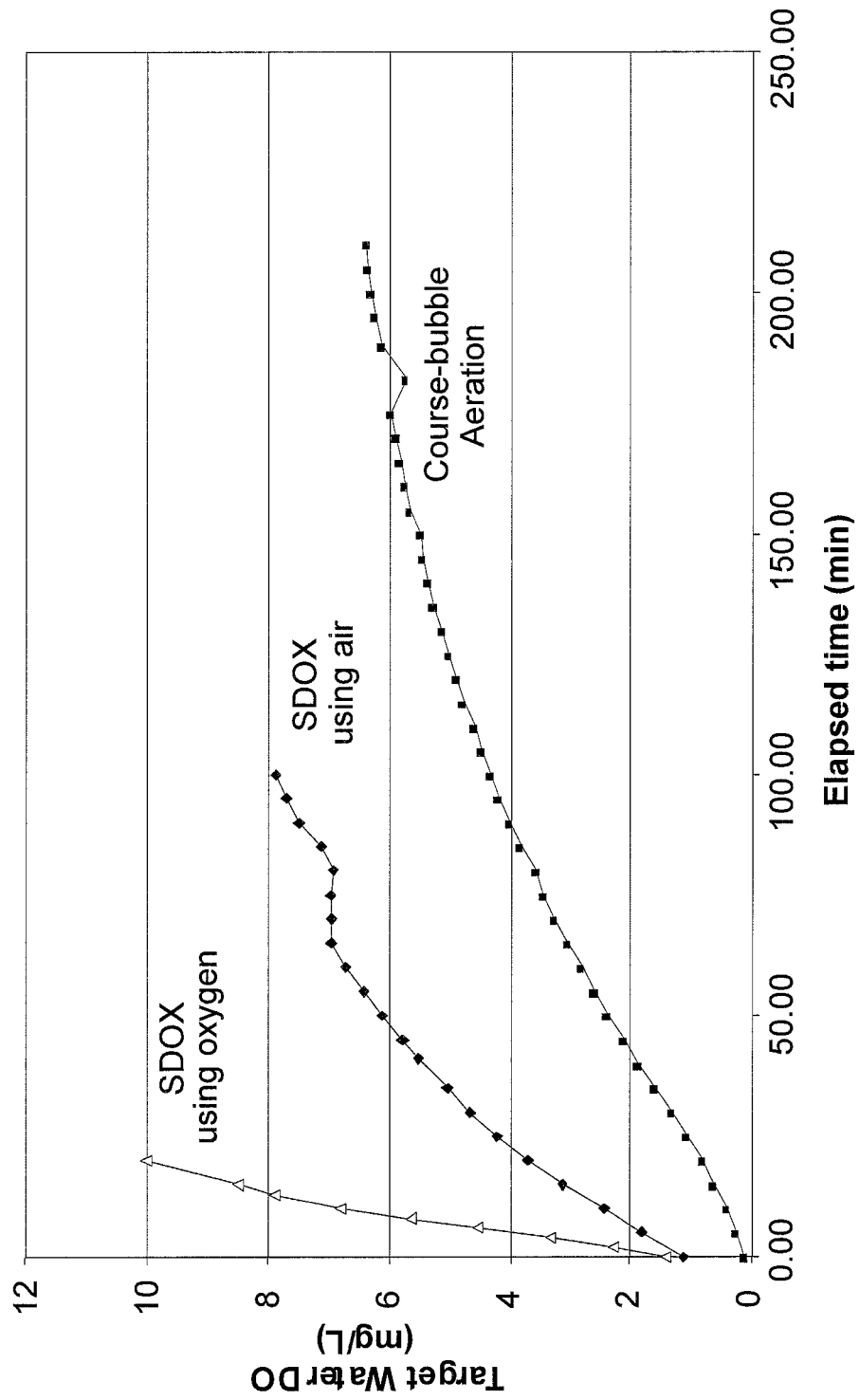
FIG. 8 shows a comparison of oxygenation rate in water of the SDOX (air and oxygen) compared to coarse-bubble aeration (air) in a 1000 gallon tank with water flow equal to 2.2 gal/min.

An early, non-optimized prototype of the SDOX system was tested using air and oxygen as gases for aeration of natural water bodies. FIG. 8 demonstrates the efficiency of oxygenation rate of the SDOX system (using air and oxygen) compared to the coarse-bubble delivery of air. In this experiment, tap water was treated with sodium sulfite (an oxygen binder) to lower the DO to 1 mg/L. The three oxygenation systems were activated to raise DO from 1 mg/L to 6 mg/L. Oxygenation rates measured were: coarse-bubble aeration at 9.1 g oxygen/hr, SDOX (air) at 22.7 g oxygen/hr and SDOX (oxygen) at 113.6 g oxygen/hr. Energy to oxygenate the tank water using the SDOX system was ⅙ that of fine-bubble aeration and the rate of delivery of oxygen using the SDOX system was 2.5 times greater using air and more than 12 times greater using oxygen as the gas.

Figure 9:
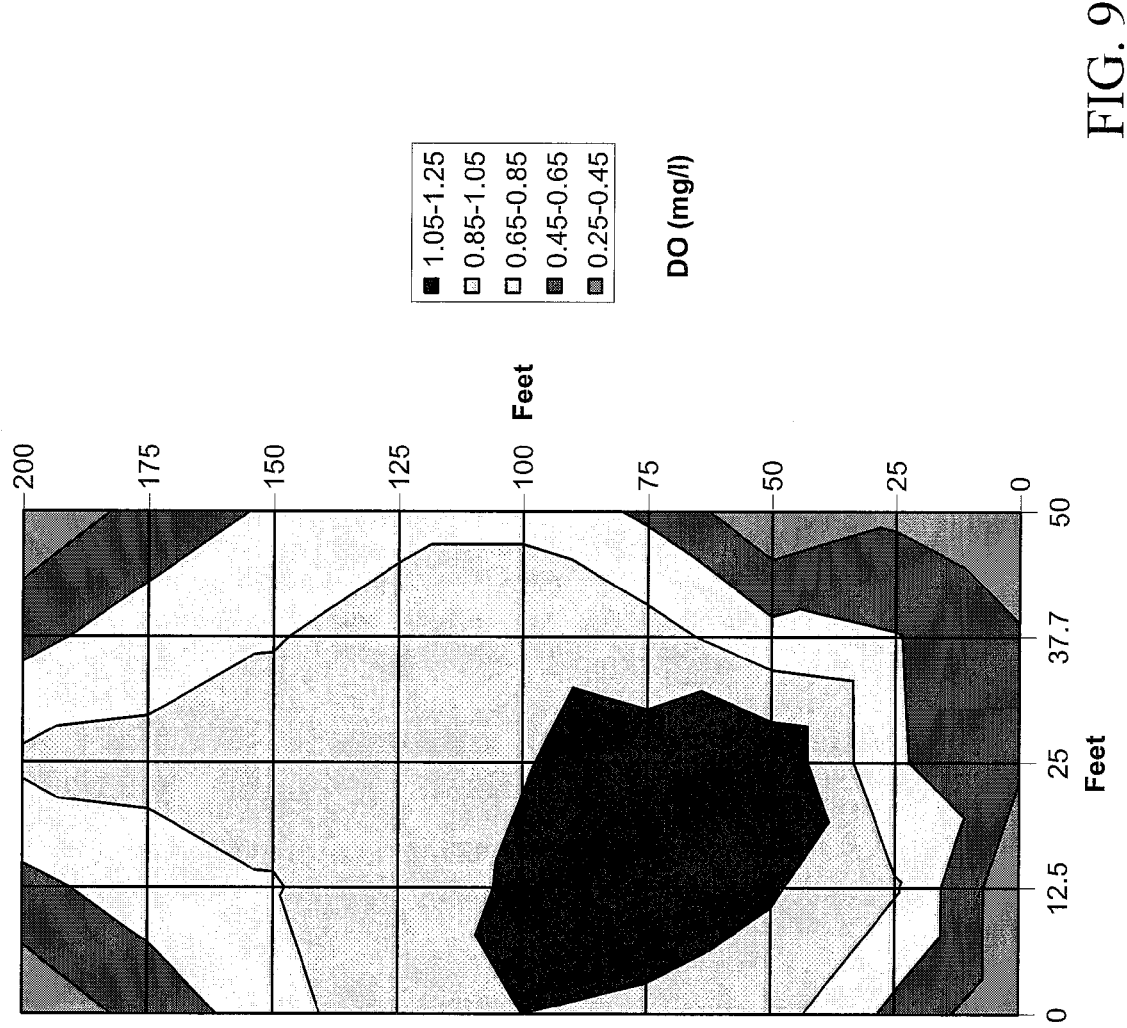
FIG. 9 shows a measured oxygen profile in Lake Atalanta after two hours of injection. The data were obtained at a depth of 20 feet after one standard size bottle of oxygen was dissolved in the SDOX and added to the lake. The dissolved oxygen in an area of about 1800 sq. ft. was increased by approximately 0.8 mg/L.
Figure 10:
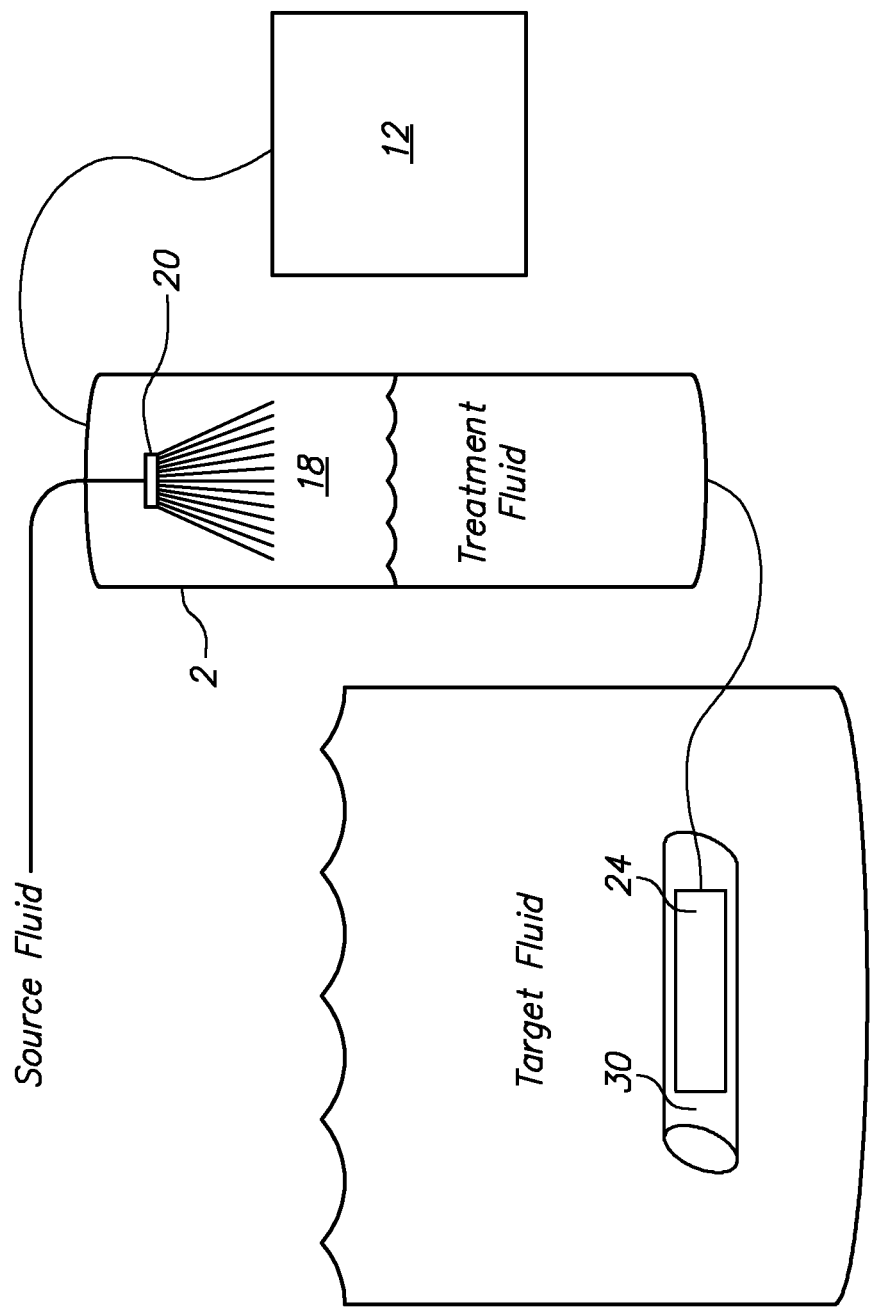
FIG. 10 shows a discharge device positioned within a liquid entrainment tube.

As an illustration of the potential for broad and efficient mixing, FIG. 9 shows the oxygen concentration within a lake after oxygen injection using a prototype SDOX unit. Oxygen was injected at a depth of 25 feet below the thermocline in a lake. The goal of the injection was to add a plume of oxygen beneath the thermocline such that the thermocline layer was not disturbed. The DO of the water prior to oxygenation was ~0.4 mg/l. Using a single bottle of oxygen, the DO was increased to 1.25 mg/L. The location of the entrainment tube injector on the graph was x=25 ft, y=0 ft. The data on the graph was collected at a depth of 20 ft. The thermocline layer was not broken and no gas bubbles exiting the top of the water column were observed from a boat directly over the plume.

The thickness (depth) of the oxygen plume was approximately 8 feet with a peak DO at the 20 ft. depth shown. This data indicates that the dissolved oxygen injected into the water stays in solution and is widely distributed (more than 200 feet from orifice tube) without significant vertical mixing The present invention has been described hereinabove with reference to certain examples for purposes of clarity and understanding. It should be appreciated by the skilled practitioner that certain modifications and improvements to the invention can be practiced within the scope of the appended claims and equivalents thereof.

What is claimed is:

1. An apparatus for dissolving a gas in a liquid, comprising:
   (a) a dissolution tank which includes:
      (i) a pressure vessel configured to contain a treated fluid and at least one gas in a head space above the treated fluid,
      (ii) at least one inlet configured to permit passage of an untreated fluid into the head space so as to dissolve gas contained in the head space in the untreated fluid, and
      (iii) an outlet configured to permit passage of the treated fluid out of the pressure vessel;

(b) a fluid supply system configured to provide the untreated fluid from a fluid source to the at least one inlet of the dissolution tank;

(c) a gas supply system configured to transport the at least one gas from a gas source to the head space contained with the pressure vessel; and (d) a discharge device external to the dissolution tank, in communication with the outlet, and immersed in a target liquid, the discharge device positioned inside an entrainment tube having a first open end and a second open end, the discharge device configured to pass the treated fluid from the dissolution tank into the target liquid.

2. The apparatus of claim 1, wherein the at least one gas includes a gas selected from the group consisting of air, oxygen, ozone, hydrogen, nitrogen, nitrous oxide, and carbon dioxide.

3. The apparatus of claim 1, wherein the fluid supply system includes at least one of a pump and a supply line.

4. The apparatus of claim 1, wherein the discharge device is at a higher pressure than the target liquid, thereby creating a greater saturation concentration value for dissolved gas in the treated fluid inside the discharge device than in the target liquid.

5. The apparatus of claim 1, further comprising a control system operable to control the amount of the at least one gas dissolved in the untreated fluid by controlling at least one of an internal pressure of the dissolution tank, a contact time between the untreated fluid and the at least one gas in the headspace, and an internal temperature of the dissolution tank.

6. The apparatus of claim 1, wherein the at least one inlet is adjustable to permit control of a fluid droplet size of the untreated fluid.

7. The apparatus of claim 1, wherein the at least one gas contained in the headspace is pressurized and operates to push the treated fluid out of the discharge device.

8. The apparatus of claim 1, wherein the discharge device is configured to mix the treated fluid containing dissolved gas exiting the discharge device with lower pressure liquid.

9. The apparatus of claim 1, wherein the discharge device includes at least one orifice.

10. The apparatus of claim 9, wherein configuration of the number, size, and arrangement of the at least one orifice is predefined such that the treated fluid containing dissolved gases mixes with lower pressure liquid and gas remains substantially dissolved in the low pressure liquid.

11. The apparatus of claim 9, wherein configuration of the number, size, and arrangement of said at least one orifice of said discharge device is predefined such that fluid containing dissolved gases mixes with lower pressure ambient liquid and at least some of the dissolved gas is released from the fluid in the form of bubbles.

12. The apparatus of claim 11, wherein the dissolution tank, the gas source, and the arrangement and size of the at least one orifices operate to control a size range of bubbles formed.

13. The apparatus of claim 9, wherein the number, size, and placement of said at least one orifice in the discharge device are predefined so as to permit the rate of fluid flow out of the device to balance the rate of fluid flow into the dissolution tank.

14. The apparatus of claim 1, further comprising an open loop control system for controlling operation of the apparatus.

15. The apparatus of claim 1, further comprising a closed loop control system for controlling operation of the apparatus.

16. The apparatus of claim 1, wherein the discharge device is configured to maintain a controlled pressure and ratio of fluid volume to head space gas volume inside the dissolution tank under constant flow conditions.

17. The apparatus of claim 1, wherein the at least one inlet includes a nozzle.

18. A method of dissolving a gas in a liquid comprising:
(a) providing a dissolution tank which includes:
(i) a pressure vessel configured to contain a treated fluid and at least one gas in a head space above the treated fluid,
(ii) at least one inlet configured to permit passage of an untreated fluid into the head space to dissolve gas contained in the head space in the untreated fluid, and
(iii) an outlet configured to permit passage of the treated fluid out of the pressure vessel;
(b) supplying the untreated fluid from a fluid source to the at least one inlet of the dissolution tank;
(c) supplying the at least one gas from a gas source to the head space contained in the pressure vessel;
(d) discharging the treated fluid from the outlet of the dissolution tank to a discharge device, the discharge device being immersed in a target liquid, the discharge device being positioned inside an entrainment tube having a first open end and a second open end; and
(e) supplying the treated fluid from the discharge device to the target fluid for mixing therewith.

19. The method of claim 18, wherein the at least one gas is selected from the group consisting of air, oxygen, ozone, hydrogen, nitrogen, nitrous oxide, and carbon dioxide.

20. The method of claim 18, wherein the treated fluid is dissolved with gas in the pressure vessel at or near saturation.

21. The method of claim 18, performed in a continuous mode.

22. The method of claim 18, performed in a pulse mode.

23. The method of claim 18, wherein at least one gas enters the vessel at or near ambient pressure and is pressurized via injection of untreated fluid into the pressure vessel until a desired higher pressure is attained within the pressure vessel.

24. The method of claim 18, wherein a rate of fluid mixing between the treated fluid discharged from the dissolution tank and the target fluid is controlled such that the dissolved gas remains substantially in a solution consisting of the treated fluid and the target fluid.

25. The method of claim 18, wherein a rate of fluid mixing between the treated fluid discharged from the dissolution tank and the target fluid is controlled such that at least some of the dissolved gas is released from a solution consisting of the treated fluid and the target fluid in the form of bubbles.

26. The method of claim 25, wherein the bubble size is within a predefined range.

27. A method of dissolving a gas in a liquid comprising:
(a) providing a dissolution tank which includes:
(i) a pressure vessel configured to contain a treated fluid and at least one gas in a head space above the treated fluid,
(ii) at least one inlet configured to permit passage of an untreated fluid into the head space to dissolve gas contained in the head space in the untreated fluid, and
(iii) an outlet configured to permit passage of the treated fluid out of the pressure vessel;
(b) supplying the untreated fluid from a fluid source to the at least one inlet of the dissolution tank;
(c) supplying the at least one gas from a gas source to the head space contained in the pressure vessel, wherein the at least one gas enters the vessel at or near ambient pressure and is pressurized via injection of untreated fluid into the pressure vessel until a desired higher pressure is attained within the pressure vessel;
(d) discharging the treated fluid from the outlet of the dissolution tank to a discharge device, the discharge device being immersed in a target liquid; and
(e) supplying the treated fluid from the discharge device to the target fluid for mixing therewith.

* * * * *